US009576291B2

United States Patent
Lamb et al.

(10) Patent No.: US 9,576,291 B2
(45) Date of Patent: Feb. 21, 2017

(54) METHOD AND SYSTEM FOR DETECTION OF A FUEL CARD USAGE EXCEPTION

(71) Applicant: FleetCor Technologies Operating Company, LLC, Norcross, GA (US)

(72) Inventors: Jeffrey D. Lamb, Atlanta, GA (US); Jason C. Cole, Roswell, GA (US); Max L. Johnson, Jr., Atlanta, GA (US)

(73) Assignee: FleetCor Technologies Operating Company, LLC, Norcross, GA (US)

( * ) Notice: Subject to any disclaimer, the term of this patent is extended or adjusted under 35 U.S.C. 154(b) by 92 days.

(21) Appl. No.: 14/632,728

(22) Filed: Feb. 26, 2015

(65) Prior Publication Data

US 2015/0170151 A1 Jun. 18, 2015

Related U.S. Application Data

(62) Division of application No. 14/054,279, filed on Oct. 15, 2013.

(Continued)

(51) Int. Cl.
*G06Q 20/40* (2012.01)
*G06Q 30/02* (2012.01)
(Continued)

(52) U.S. Cl.
CPC ...... *G06Q 20/4016* (2013.01); *G06Q 20/3224* (2013.01); *G06Q 20/342* (2013.01);
(Continued)

(58) Field of Classification Search
CPC ................................................. G06Q 20/4016
See application file for complete search history.

(56) References Cited

U.S. PATENT DOCUMENTS

| | | |
|---|---|---|
| 4,658,371 A | 4/1987 | Walsh et al. |
| 6,438,452 B1 | 8/2002 | Dickson |

(Continued)

FOREIGN PATENT DOCUMENTS

WO WO 2011/048579 4/2011

OTHER PUBLICATIONS

International Search Report for International Patent Application No. PCT/US2014/056974, issued Dec. 24, 2014.

(Continued)

*Primary Examiner* — Robert R Niquette
(74) *Attorney, Agent, or Firm* — King & Spalding

(57) ABSTRACT

Determining a fuel card usage exception with the use of a computer that receives fuel card transaction data responsive to a fuel purchase event. The fuel card transaction data identifies a quantity of fuel purchased for a vehicle using a fuel card. In addition, the computer receives first fuel level data and second fuel level data of the vehicle that identifies a quantity of fuel present in a fuel tank of the vehicle prior to a fuel purchase event and after a fuel purchase event respectively. The computer can determine an exception associated with the fuel purchase event based on the fuel card transaction data, the first fuel level data, and the second fuel level data. Responsive to detecting an exception associated with the fuel purchase event, the computer may generate an alert and transmit the alert for presentation by a computing device of a user.

17 Claims, 17 Drawing Sheets

Related U.S. Application Data

(60) Provisional application No. 61/714,436, filed on Oct. 16, 2012.

(51) Int. Cl.
*G06Q 20/34* (2012.01)
*G06Q 20/32* (2012.01)
*G06Q 50/06* (2012.01)

(52) U.S. Cl.
CPC ....... *G06Q 20/405* (2013.01); *G06Q 30/0269* (2013.01); *G06Q 50/06* (2013.01)

(56) References Cited

U.S. PATENT DOCUMENTS

| | | |
|---|---|---|
| 6,529,808 B1 | 3/2003 | Diem |
| 6,636,790 B1 | 10/2003 | Lightner et al. |
| 6,714,857 B2 | 3/2004 | Kapolka et al. |
| 7,340,332 B2 | 3/2008 | Underdahl et al. |
| 7,362,229 B2 | 4/2008 | Brinton et al. |
| 7,388,518 B2 | 6/2008 | Mitchell et al. |
| 7,397,365 B2 | 7/2008 | Wang |
| 7,400,970 B2 | 7/2008 | Jones |
| 7,487,019 B2 | 2/2009 | Estes et al. |
| 7,538,667 B2 | 5/2009 | Koen |
| 7,557,696 B2 | 7/2009 | Brinton et al. |
| 7,564,375 B2 | 7/2009 | Brinton et al. |
| 7,584,887 B1 | 9/2009 | Sanchez et al. |
| 7,606,579 B2 | 10/2009 | Thacher |
| 7,612,668 B2 | 11/2009 | Harvey |
| 7,616,129 B2 | 11/2009 | Thacher |
| 7,623,985 B2 | 11/2009 | Finch, II et al. |
| 7,650,300 B2 | 1/2010 | Darvish et al. |
| 7,680,595 B2 | 3/2010 | Brinton et al. |
| 7,752,302 B2 | 7/2010 | Thacher |
| 7,769,499 B2 | 8/2010 | McQuade et al. |
| 7,801,506 B2 | 9/2010 | Haave et al. |
| 7,808,369 B2 | 10/2010 | Brinton et al. |
| 7,940,173 B2 | 5/2011 | Koen |
| 7,944,345 B2 | 5/2011 | Brinton et al. |
| 8,040,256 B2 | 10/2011 | Rani et al. |
| 8,064,930 B2 | 11/2011 | Enzmann et al. |
| 8,106,757 B2 | 1/2012 | Brinton et al. |
| 8,146,009 B2 | 3/2012 | Mason et al. |
| 8,179,321 B2 | 5/2012 | Rani et al. |
| 8,199,901 B2 | 6/2012 | Rani et al. |
| 8,214,142 B2 | 7/2012 | Cerecke et al. |
| 8,267,317 B1 | 9/2012 | Gulli |
| 8,275,508 B1 | 9/2012 | Adams et al. |
| 8,290,701 B2 | 10/2012 | Mason et al. |
| 8,292,171 B2 * | 10/2012 | Granruth .............. G06Q 10/06 235/375 |
| 8,301,158 B1 | 10/2012 | Thomas |
| 8,315,802 B2 | 11/2012 | Brown |
| 8,365,997 B2 | 2/2013 | Gulli |
| 8,527,135 B2 | 9/2013 | Lowry et al. |
| 2002/0183904 A1 | 12/2002 | Sakurai et al. |
| 2003/0195676 A1* | 10/2003 | Kelly ................... G07C 5/008 701/31.4 |
| 2004/0128256 A1* | 7/2004 | Krouse .................. G06Q 20/04 705/65 |
| 2005/0033694 A1 | 2/2005 | Perrin |
| 2005/0256681 A1 | 11/2005 | Brinton et al. |
| 2007/0173993 A1* | 7/2007 | Nielsen ................. G07C 5/085 701/33.4 |
| 2008/0035725 A1* | 2/2008 | Jambunathan ......... G06Q 20/32 235/380 |
| 2008/0162346 A1* | 7/2008 | Aaron .................... G06Q 20/24 705/44 |
| 2009/0012898 A1* | 1/2009 | Sharma ................. G06Q 20/24 705/44 |
| 2009/0237245 A1 | 9/2009 | Brinton et al. |
| 2009/0248581 A1* | 10/2009 | Brown ............ G06K 19/06187 705/67 |
| 2009/0280771 A1 | 11/2009 | Bolin |
| 2009/0306997 A1* | 12/2009 | Betancourt ........... G07F 13/025 705/1.1 |
| 2009/0327135 A1* | 12/2009 | Nguyen ................. G06Q 20/40 705/44 |
| 2010/0185479 A1 | 7/2010 | Brinton et al. |
| 2010/0235891 A1 | 9/2010 | Oglesbee |
| 2010/0280734 A1 | 11/2010 | Brinton et al. |
| 2010/0332363 A1* | 12/2010 | Duddle ................. B67D 7/348 705/34 |
| 2011/0022248 A1 | 1/2011 | McQuade et al. |
| 2011/0047075 A1* | 2/2011 | Fourez .................. G06Q 20/32 705/44 |
| 2011/0060521 A1 | 3/2011 | Watkins |
| 2011/0068954 A1 | 3/2011 | McQuade et al. |
| 2011/0093306 A1 | 4/2011 | Nielson et al. |
| 2011/0130914 A1 | 6/2011 | Shah et al. |
| 2011/0140877 A1* | 6/2011 | Gilchrist ................ B60K 15/04 340/450.2 |
| 2011/0238300 A1 | 9/2011 | Schenken |
| 2011/0313646 A1 | 12/2011 | Kancharla et al. |
| 2012/0010774 A1 | 1/2012 | McQuade et al. |
| 2012/0053778 A1 | 3/2012 | Colvin et al. |
| 2012/0095920 A1 | 4/2012 | McQuade et al. |
| 2012/0136527 A1 | 5/2012 | McQuade et al. |
| 2012/0136743 A1 | 5/2012 | McQuade et al. |
| 2012/0136802 A1 | 5/2012 | McQuade et al. |
| 2012/0139696 A1 | 6/2012 | McQuade et al. |
| 2013/0030934 A1* | 1/2013 | Bakshi .................. G06Q 20/40 705/18 |
| 2013/0185193 A1* | 7/2013 | Boling .............. G06Q 20/3224 705/39 |

OTHER PUBLICATIONS

International Search Report for International Patent Application No. PCT/US2013/065030, issued Mar. 6, 2014.

* cited by examiner

METHOD AND SYSTEM FOR DETECTION OF A FUEL CARD USAGE EXCEPTION

CROSS-REFERENCE TO RELATED APPLICATIONS

This application is a divisional application of U.S. patent application Ser. No. 14/054,279 filed Oct. 15, 2013, which claims priority to U.S. Provisional Patent Application No. 61/714,436, filed Oct. 16, 2012, entitled "Fuel Card Transaction Fraud Detection, Authorization, and Promotion," the entire contents of each identified application are hereby incorporated herein by reference.

FIELD OF INVENTION

This disclosure relates generally to a technical field of fraud detection and, in one example embodiment, and in particular to a system, method, and apparatus for detection of a fuel card usage exception.

BACKGROUND

Businesses may own and/or lease vehicles that may be used for accomplishing various business activities. For example, business may use the vehicles for goods transportation, fulfilling delivery orders, and/or employee travel related to the businesses. While the vehicles are being used for business activities, the businesses may cover the incurred fuel cost and/or the maintenance cost of the vehicles. To pay for the said costs, the businesses may furnish the drivers of the vehicles with payment cards that are secure, such as financial services cards and/or fuel cards that may be used to cover any expenses associated with the vehicle, such as fuel purchase, and maintenance.

Despite receiving fuel cards that are secure, the drivers may use the payment cards fraudulently in ways that are undetectable by conventional technology. For example, the driver may use the payment card to purchase fuel for personal purposes, or the driver may use the fuel card to purchase fuel for their personal vehicle. Such fraudulent usage of the payment cards may result in the business incurring a monetary loss which may affect the financial goals of the business. In addition to fraudulent usage of the fuel card, drivers may not use the provided payment card on a consistent basis, i.e., for some transactions the driver may choose to use a different payment card other than the one provided to them, and thereby loose discounts or offers that are available via the payment card provided by the business. For example, a driver may be habitually inclined to use a personal financial services card that is not provided by the business and later claim reimbursements. The business may not be able to track the usage of the personal payment card and may have to accept reimbursement claims on their face value which may or may not be legitimate.

Further, different drivers may have different driving habits which may affect a gas mileage and a frequency of vehicle maintenance. For example, some drivers may be very rough in the way they drive the vehicle, thereby reducing a gas mileage and increasing a vehicle maintenance frequency. Bad driving habits may increase a gas consumption of the vehicle which in turn increases an operation cost of the vehicle and thus the profitability of the business. Conventional technology may lack the ability to extensively track driving patterns, fuel card usage, varying gas mileages and so on, which may directly and/or indirectly affect the monetary goals of the businesses that operate the vehicles. Thus, there is a need for a technology that addresses the above-mentioned deficiencies.

SUMMARY

For one aspect of the present invention, a server can receive fuel card transaction data for a fuel purchase event completed by the use a fuel card. The fuel card transaction data identifies a quantity of fuel purchased for a vehicle. The server also can receive a first fuel level data of the vehicle and a second fuel level data of the vehicle. The first fuel level data identifies a quantity of fuel present in a fuel tank of the vehicle prior to the fuel purchase event. The second fuel level data identifies the quantity of fuel present in the fuel tank of the vehicle after the fuel purchase event. A vehicle bus in the vehicle can collect the fuel level data and a telematics devices in the vehicle can transmit the collected fuel level data to the server. The server can determine an exception associated with the fuel purchase event based on the fuel card transaction data, the first fuel level data, and the second fuel level data. In response to this determination, the server can generate an alert.

For another aspect of the present invention, a server can receive an authorization request to authorize a fuel purchase event using a fuel card. The authorization request comprises data that identifies a location of the fuel purchase event. The server also can receive location data for a vehicle, the location data identifying a location of the vehicle. The server can determine if the location of the fuel purchase event substantially matches the location of the vehicle. If the location of the fuel purchase event does not substantially match the location of the vehicle, typically within a predetermined threshold, the server can generate an alert. The server can transmit the alert for presentation by a computing device of a user.

BRIEF DESCRIPTION OF THE FIGURES

Example embodiments are illustrated by way of example and not limitation in the figures of the accompanying drawings, in which.

Figure 1:
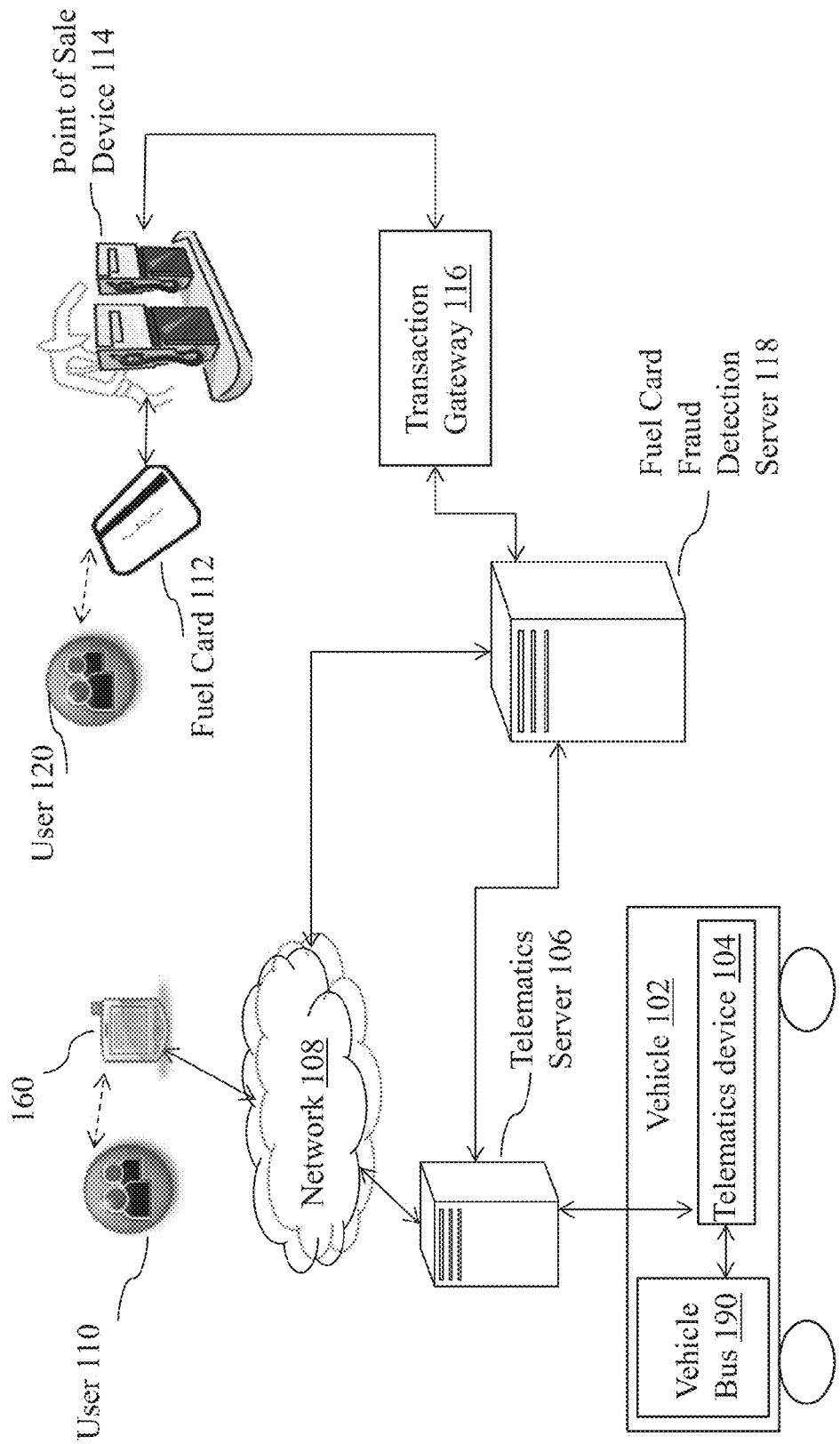
FIG. 1 illustrates an example system for detection of fuel card usage exception, according to certain exemplary embodiments of the present invention.

Many aspects of the invention may be better understood with reference to the above drawings. The elements and features shown in the drawings are not to scale, emphasis instead being placed upon clearly illustrating the principles of exemplary embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DETAILED DESCRIPTION

Disclosed are a system, a method and an apparatus for detecting a fuel card usage exception. Before discussing the embodiments directed to the method and system of detecting fuel card usage exception, it may assist the reader to understand the various terms used herein by way of a general description of the terms in the following paragraphs.

The term 'near real-time,' as used herein may refer to the time delay introduced, by automated data processing or network transmission, between the occurrence of an event and the use of the processed data. For example, a near-real-time processing may depict an event or situation as it existed at the current time minus the processing time, as nearly the time of the live event or contemporaneous with that event.

The term 'fuel level data,' as used herein may generally refer to any appropriate data representative of a quantity of fuel present in a fuel tank of a vehicle. In one example embodiment, the fuel level data may be an indirect representation of the amount of fuel present in the vehicle's fuel tank, such as in the form of a percentage value. For example, the fuel level data may indicate that that fuel level is 25%, which means that the fuel level is one-quarter of the vehicle's fuel tank, i.e., for a twelve gallon fuel tank, a fuel level of 25% may indicate that the vehicle has approximately three gallons of fuel. In another example embodiment, the fuel level data may be a direct representation of the amount of fuel present in the vehicle's fuel tank, such as in the form of an absolute numerical value. For example, the fuel level data may indicate that the fuel level is five gallons.

The term 'vehicle bus,' as used herein may generally refer to any appropriate internal communications network of a vehicle that interconnects components inside the vehicle. The internal communications network of the vehicle may allow microcontrollers and devices such as engine control unit, transmission control unit, anti-lock breaking system, body control modules, other sensors, etc., that are already present in the vehicle to communicate with each other within the vehicle. The internal communication network, the micro-controller, and the devices of the vehicle may operate in concert to collect, handle, and maintain any appropriate data associated with a condition of the vehicle, such as fuel level data of the vehicle, brake fluid level, engine status, and so on. The different vehicle bus protocols may include, but are not limited to, Controller Area Network (CAN), Local Interconnect Network (LIN), Domestic Digital Bus (D2B), FlexRay, DC-BUS, IEBus, Media Oriented Systems Transport (MOST), SMARTwireX, and so on.

In one example embodiment, the data collected, handled, and/or maintained by the vehicle bus can be obtained by connecting to the vehicle bus via an on board diagnostics (OBD) connector. One of ordinary skill in the art can understand and appreciate that the list of example devices, microcontrollers, and data collected and maintained by the vehicles internal communication network is not exhaustive.

The term 'telematics device' as used herein may generally refer to any appropriate device that is adapted to send, receive, and store information via telecommunication devices. In one example embodiment, the telematics device may be configured to send information associated with a vehicle, such as location of the vehicle, a heading direction of the vehicle, speed of the vehicle, distance travelled by the vehicle, and so on. In addition, the telematics device may be configured to store and/or send data associated with a condition of the vehicle. In particular, the telematics device may be configured to receive the fuel level data of the vehicle from the vehicle bus and/or communicate the received fuel level data over a telecommunication network.

The telematics device may be adapted to be used with the vehicle. In one embodiment, the telematics device may be an independently purchasable device that is configured to be attached to and/or detached from the vehicle as desired. For example, the telematics device 104 may be attached to an onboard diagnostics (OBD) port of the vehicle to receive data associated with the vehicle from the vehicle bus. In another embodiment, the telematics device may be integrated with the vehicle. For example, the telematics device may be a Global Positioning System technology integrated with computers and mobile communications technology present in automotive navigation and internal network systems, such as OnStar®.

The term 'fuel card,' as used herein may generally refer to any appropriate payment card. In one example embodiment, the fuel card may be specifically adapted to be used for purchasing fuel. One of ordinary skill in the art can understand and appreciate that the fuel card may be used for any other appropriate purchases other than or in addition to fuel purchase, without departing from the broader scope of this disclosure. In another example embodiment, the fuel card may be any appropriate financial services card such as a debit card, credit card, gift card, and so on.

In one example embodiment, the fuel card may be a physical card, such as a magnetic stripe card. In another example embodiment, the fuel card may be a smart card. For example, the fuel card may be an NFC based card, RFID based card, QR code based card, and so on. In yet another example embodiment, the fuel card may be software implementation, such as a mobile payment card stored in a mobile wallet wherein the payment is performed from and/or via a mobile computing device.

Any appropriate fuel card and/or payment card that runs on and/or is processed and handled by a proprietary network may be referred to as a 'proprietary fuel card.' In one embodiment, the proprietary fuel card may be related to (e.g., has proprietary interest and issued by) a business that generates and/or provides alerts corresponding to the fuel card usage exception. As described above, if the fuel card is related to the business that generates and/or provides the alerts corresponding to the fuel card usage, then the authorization of the fuel card and transaction associated the fuel card may be processed and handled by a proprietary network of the business. Accordingly, all authorizations, transactions and/or other card related information may be transparent to the business in near real-time.

In another embodiment, a fuel card and/or payment card may not be related to the business that generates and/or provides alerts corresponding to the fuel card usage exception. Accordingly, the fuel card and/or payment card may run on and/or may be processed and handled by a non-proprietary network. In other words, if the fuel card is not related to the business, then the authorizations and transactions associated with the fuel card may be handled outside of the business's proprietary network. Accordingly, the business may only have limited visibility of the authorization process, transaction process, and/or information regarding the fuel card. In other words, if the fuel card is not related to the business, then not all data is obtained in near real-time.

Data that is not obtained in near real-time may be obtained at a later time, for example along with data that is provided in the form of batches (overnight or several day later). Any appropriate fuel card and/or payment card that runs on and/or is processed and handled by a non-proprietary network may be referred to as a 'non-proprietary fuel card.'

The term 'fuel card transaction data,' as used herein may generally refer to any appropriate data associated with the usage of the fuel card. For example, the fuel card transaction data can include information representative of the location at which the fuel card was used, the time and date at which at the fuel card was used, a quantity of an item purchased using the fuel card, and so on. One of ordinary skill in the art can understand and appreciate that these examples of fuel card transaction data are not exhaustive and that the fuel card transaction data may include or may include some of the above mentioned data. In some embodiments, the fuel card transaction data may include any appropriate number and type of additional information associated with purchase using the fuel card. For example, in one embodiment, the fuel card transaction data may include information regarding any non-fuel purchases using the fuel card.

The term 'exception associated with the fuel purchase event' used herein may generally refer to any inappropriate event associated with a usage of the fuel card. For example, the exception may include an event where a driver made a fraudulent fuel purchase using the fuel card. In some embodiments, the exception may be any purchase for which the fuel card that is not authorized. For example, the fuel card may not be authorized to make any non-fuel purchases. In some other embodiments, the exception may be any appropriate event that is a deviant from a previous consistent pattern associated with the usage of the fuel card and/or a vehicle performance. For example, the exception may include an event where driver purchases fuel using a payment method other than the fuel card. In another example, the exception may be a change in current gas mileage of the vehicle compared to a previous consistent gas mileage of the vehicle. In another example embodiment, the exception may be any appropriate event representative of inconsistencies associated with fuel purchase, and/or vehicle usage that is of interest to a user. Further, exception may be associated with non-fuel purchases, such as events associated with maintenance of the vehicle, and so on.

It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

An exemplary system for detecting a fuel card usage exception includes a telematics device that is communicatively coupled to a telematics server. Further, the telematics device is coupled to the vehicle bus of a vehicle. The telematics device obtains telematics data and/or fuel level data of the vehicle from the vehicle bus, which is then transmitted to the telematics server. In addition to receiving the telematics data and/or the fuel level data of the vehicle, the telematics server receives fuel card transaction data from a fuel card fraud detection server (herein 'fuel card server'). The fuel card server receives the fuel card transaction data responsive to a driver using a fuel card to pay for a purchase. Upon receiving the fuel level data, the telematics data, and the fuel card transaction data, the telematics server determines if an exception associated with the usage of the fuel card based on the received data. If it is determined that the exception has occurred, then the telematics server generates an alert and transmit the alert to appropriate users of the system.

In one embodiment, the alerts are transmitted to the appropriate users of the system in near real-time. The near real-time alerts may include alerts associated with proprietary fuel card and alerts associated with non-proprietary fuel cards. Information to generate near real-time alerts may be obtained during an authorization of a transaction request associated with the fuel card.

If the fuel card is a non-proprietary fuel card, then during authorization, the information received by the fuel card server may be limited to a location where the fuel card is being used (e.g., location of the POS device or gas station). Accordingly, the alerts associated with the non-proprietary fuel cards may be a location based alert, wherein the system determines if the location of the vehicle received from the telematics device substantially matches the location where the fuel card is being used. One of ordinary skill in the art can understand and appreciate that the information received during authorization of a non-proprietary fuel card may include other additional data, such as card number, encrypted card number, product type (unleaded, leaded, premium fuel, etc.), price per gallon of fuel for each grade of fuel, and so on.

If the fuel card is a proprietary fuel card, then during authorization, the information received by the fuel card server may include the quantity of fuel purchased using the fuel card, and/or a location where the fuel card is being used (e.g., location of the POS device or gas station). Accordingly, the alerts associated with the proprietary fuel cards may be a fuel purchase based alert, wherein the system determines if the fuel purchased substantially matches the fuel level data of the vehicle received from the telematics device. In some embodiments, the near real-time alerts for proprietary fuel cards may include a combination of fuel purchase based alerts and location based alerts. One of ordinary skill in the art can understand and appreciate that the information received during authorization of a proprietary fuel card may include other additional data, such as card number, encrypted card number, price of purchased product, product type (unleaded, leaded, premium fuel, etc.), price per gallon of fuel for each grade of fuel, and so on. One of ordinary skill in the art can further understand and appreciate that the data associated with the usage of the fuel card, whether proprietary or non-proprietary, can include data associated with non-fuel products.

In another embodiment, the alerts may not be near real-time alerts. Non real-time alerts may be generated upon receiving fuel card transaction data associated with a purchase using the fuel card. In an example embodiment, the fuel card transaction data may be received in the form of batch data at a later time after the transaction using the fuel card is completed, such as end of each day, after several days, and so on. In other words, authorization data is received in near real-time, while the fuel card transaction data is received at a later time after a transaction using the fuel card is completed.

In another embodiment, the fuel card server receives the telematics data, the fuel level data of the vehicle, and the fuel card transaction data to determine an exception associated with the fuel card usage. In yet another embodiment, the telematics data, the fuel level data, and the fuel card transaction data are transmitted to a third party server which in turn may be configured to determine the exception associated with the fuel card usage.

Figure 2:
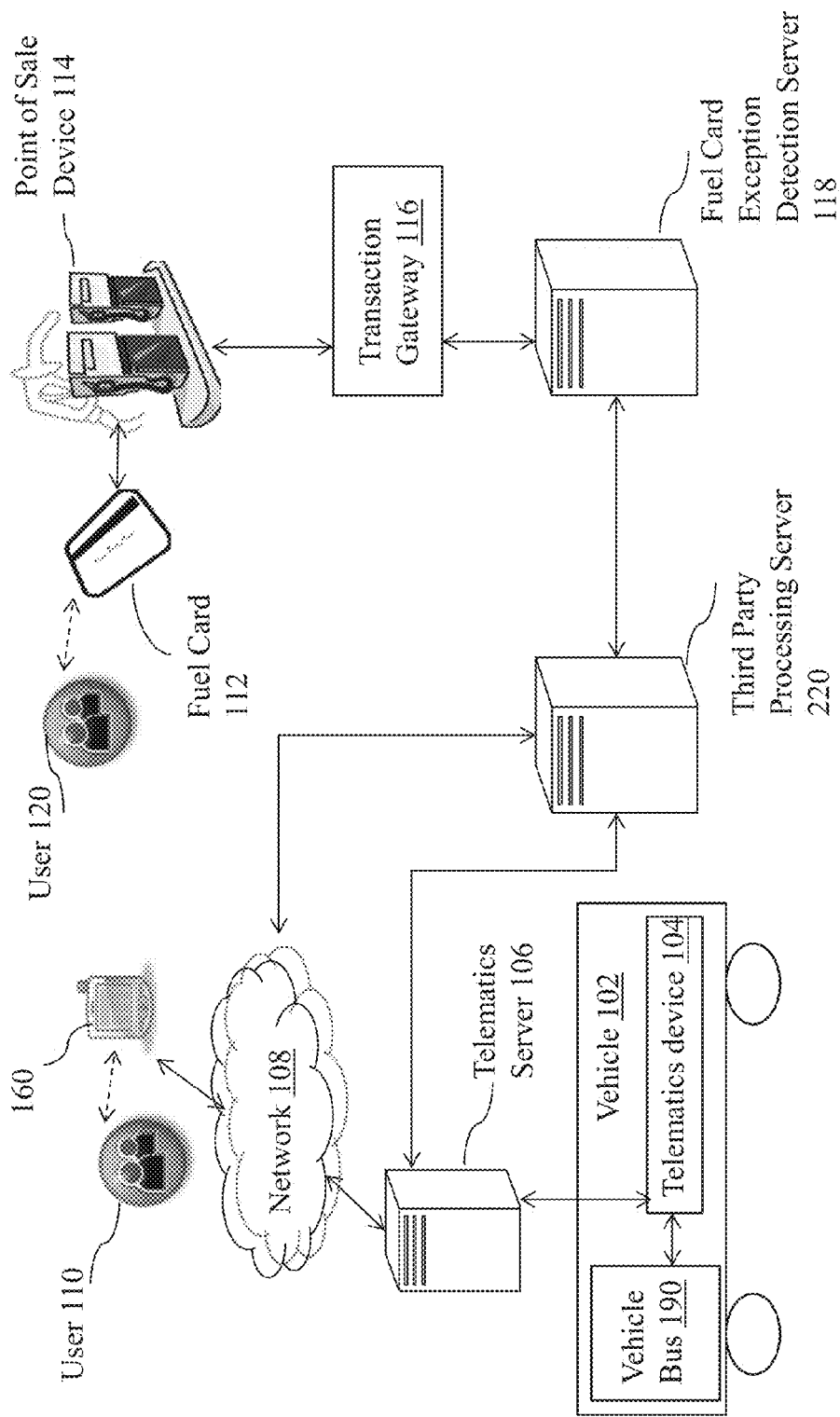
FIG. 2 illustrates another example system for detection of fuel card usage exception, according to certain exemplary embodiments of the present invention.
Figure 3:
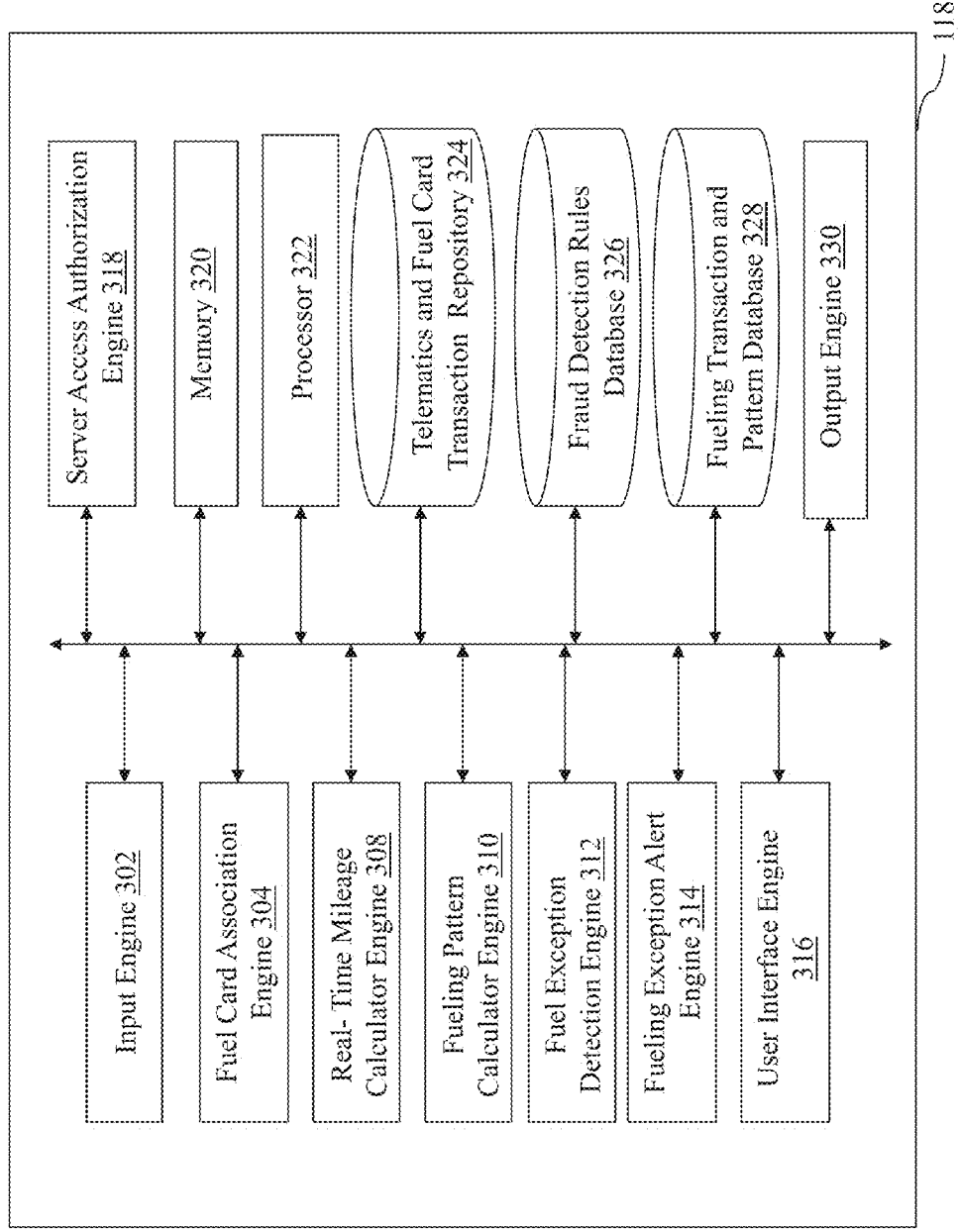
FIG. 3 illustrates a functional block diagram of the fuel card exception detection server, according to certain exemplary embodiments of the present invention.

Technology for detecting fuel card usage exception will now be described in greater detail with reference to FIGS. 1-11, which describe representative embodiments of the present invention. First, FIGS. 1 and 2 will be discussed in the context of describing a representative operating environment associated with the detection of fuel card usage exception according to certain exemplary embodiments of the present invention. FIG. 3 will be discussed, making exemplary reference back to FIGS. 1 and 2 as may be appropriate or helpful. Further, the remaining FIGS. 4-11 will be discussed, making exemplary reference back to FIGS. 1-3 as may be appropriate or helpful.

The following paragraphs describe various embodiments of the method and system for detecting a fuel card usage exception. It will be appreciated that the various embodiments discussed herein need not necessarily belong to the same group of exemplary embodiments, and may be grouped into various other embodiments not explicitly disclosed herein. In the following description, for purposes of explanation, numerous specific details are set forth in order to provide a thorough understanding of the various embodiments.

Further, the present invention may be embodied in many different forms and should not be construed as limited to the embodiments set forth herein; rather, these embodiments are provided so that this disclosure will be thorough and complete, and will fully convey the scope of the invention to those having ordinary skill in the art. Furthermore, all "examples" or "exemplary embodiments" given herein are intended to be non-limiting and among others supported by representations of the present invention.

Moving now to discuss the FIGS. 1-3 further, an exemplary embodiment of the present invention will be described in detail. As further discussed below and in accordance with certain embodiments of the present invention, FIGS. 1 and 2 illustrate an exemplary operational system for detecting a fuel card usage exception; while FIG. 3 illustrates exemplary system elements such as a fuel card server.

FIG. 1 illustrates an example system for detection of fuel card usage exception, according to certain exemplary embodiments of the present invention. In particular, FIG. 1 illustrates a vehicle 102, a telematics device 104, a vehicle bus 190, a telematics server 106, a network 108, a user 110, a user 120, a fuel card 112, a point of sale device 114, a transaction gateway 116, and a fuel card server 118.

In one embodiment, the telematics device 104 may be configured for use with the vehicle 102. In particular, the telematics device 104 may be configured to be used with the vehicle bus 190 of the vehicle 102. The telematics device 104 may be configured to collect and transmit fuel level data and/or telematics data associated with the vehicle 102 from the vehicle bus 190 and transmit the collected data to the telematics server 106 and/or the fuel card server 118. In addition, the telematics device 104 may be configured to timestamp the fuel level data and/or the telematics data, wherein the timestamps may provide information associated with a time and date at which the fuel level data and/or the telematics data is obtained by the telematics device or obtained by the vehicle bus 190. For example, the telematics data may include a vehicle location data which has a timestamp, wherein the timestamp associated with the vehicle location data may provide date and time at which the location of the vehicle was recorded either by the vehicle bus 190 or by the telematics device 104.

In one embodiment, the telematics device 104 may be configured to transmit the fuel level data and the telematics data of the vehicle 102 based on pre-set trigger events, i.e., the telematics device may automatically transmit data when the trigger event occurs. For example, the trigger event may include turning on the ignition of the vehicle or turning off the ignition of the vehicle, reaching pre-set intervals of time or distance, i.e., the telematics device 104 may be configured to transmit fuel level data and/or telematics data at regular intervals of time or distance. In another embodiment, the telematics device 104 may be configured to transmit the fuel level data and/or the telematics data upon receiving a request for the fuel level data and/or the telematics data. In yet another example embodiment, the telematics device 104 may be configured to transmit the fuel level data and/or the telematics data based on a location of the vehicle. For example, when the telematics device 104 determines that the vehicle 102 has crossed a virtual geographical boundary such as geo-fence, the telematics device 104 may be configured to transmit the fuel level data and/or telematics data. In said example, the telematics device 104 may be configured to transmit a first fuel level data when the vehicle enters a geo-fence and the a second fuel level data when the vehicle leaves the geo-fence.

In one embodiment, the frequency of transmission of the fuel level data may vary from the frequency of transmission of the telematics data. For example, the telematics device 104 may be configured to transmit the fuel level data only when the vehicle is at rest, such as when the vehicle is turned on or turned off, whereas the telematics data may be transmitted every 10 minutes when the vehicle is in motion. In some embodiments, the frequency of transmission of each data may be independent of each other and may be user settable. In some other embodiments, the frequency of transmission of the fuel level data and the telematics data may be the same. In one example embodiment, the fuel level data may be transmitted along with the telematics data as a part of the telematics data.

As described above, the telematics device 104 may transmit the telematics data and/or the fuel level data to the telematics server 106. In one embodiment, the telematics server 106 may be implemented as a centralized server system and/or a distributed server system using one or more computing devices. In one example embodiment, the telematics server 106 may be a web server that has a web interface through which users 110/120 can access the telematics server 106. In particular, the users 110/120 may access the telematics server 106 over the network 108, which may be a private and/or public network. In one example embodiment, the users 110/120 may register with the telematics server 106 to be subscribed users that receive services provided by the telematics server 106. Without being exhaustive, a few examples of the services offered by the telematics server 106 may include a periodic update of telematics data associated with the vehicle 102, a fuel level data associated with the vehicle, etc. In some embodiments, the data provided to the users 110/120 may be formatted based on a user's preference which may be indicated during registration with the telematics server 106. Accordingly, upon receiving the fuel level data and/or the telematics data, the telematics server 106 may be configured to process the data to convert the received data from the format specific to the telematics device 104 into a format that is presentable to the users 110/120. The data may be presented by a computing devices (e.g., computing device 160) associated with the users 110/120. The computing device associated with users 110/120 may include stationary computing devices and/or mobile computing devices such as laptops, tablets, smartphones, desktop PCs, etc.

As illustrated in FIG. 1, the telematics server 106 may be communicatively coupled to the computing device 160 of the users 110 and 120, the telematics device 104 and/or the fuel card server 118. In addition, the telematics server 106 may be communicatively coupled to other additional external databases and/or servers to obtain information that may aid in processing and formatting the data received from the telematics device 104. For example, if the fuel level data received from the telematics device 104 is in the form of percentage of the fuel tank capacity, such as 25%, then the telematics server 106 may have to obtain the vehicle's fuel tank capacity from the vehicle manufacturers database or third party database to convert the fuel level data to a user understandable and/or a user desired format. In some embodiments, the information that may aid in processing and formatting the data received from the telematics device 104 may be pre-stored in a database of the telematics server 106. For example, a database of the telematics server 106 may include the vehicle's profile data such as fuel tank capacity, make, model, year, gas mileage associated with one or more vehicles.

In an example embodiment, the user 110 as illustrated in FIG. 1, may be any user who is designated to manage a business's transportation fleet comprising one or more vehicles, such as vehicle 102 for business activities. As described above, in one embodiment, the user 110 may be registered with the telematics server 106 to receive the telematics data and/or other additional data, such as fuel level data and exception alerts which will be described below in greater detail. As a process of managing a transportation fleet, the user 110, e.g., the manager may provide a fuel card to the user 120, e.g., a driver of the vehicle 102, wherein the user 120 may use the fuel card to make any appropriate payments associated with the vehicle 102. For example, the user 120 may use the fuel card for refueling the vehicle 102.

In one embodiment, the fuel card 112 may be regulated based on certain rules such as the number of purchases that a user is allowed to make using the fuel card, specific gas stations and the POS devices where the fuel card 112 may be used, the time of day that the fuel card may be used for purchases, and so on. In another embodiment, the fuel card may be void of such regulations, i.e., a user 120 may be provided unregulated use of the fuel card 112.

In one embodiment, based on a condition of the vehicle 102, such as a low fuel level, the user 120 (herein 'driver') may decide to refuel the vehicle 102 using the fuel card 112. Accordingly, to purchase fuel, the driver 120 may use the fuel card at a POS device 114. The POS device 114 may include a computing device adapted to read, authorize, and/or process the fuel card 112, e.g., a fuel card reader integrated with a fuel dispenser. In some embodiments, the fuel card 112 may be pre-authorized for purchase. In other embodiments, the driver 120 may have to enter a personal identification number (PIN) associated with the fuel card 112 which may then be validated to authorize the usage of the fuel card 112.

In one embodiment, when the driver 120 uses the fuel card 112 at the POS device 114 to purchase fuel, first the POS device 114 may check if the account associated with the fuel card 112 is approved to complete the transaction. Accordingly, the POS device 114 may be configured to transmit an authorization request associated with the fuel card 112 to a transaction gateway 116. In one embodiment, the transaction gateway 116 may be any appropriate payment transaction processing device, such as a server associated with a financial services institution.

In an example embodiment, the authorization request may be transmitted to the transaction gateway 116, the fuel card server 118, and/or the telematics server 106 in near real-time. In one embodiment, the authorization request may include a pre-purchase authorization request and/or a post-purchase authorization request. The pre-purchase authorization request may refer to a request to authorize a usage of the fuel card and may include, inter alia, a location of the POS device/system 114 where the fuel card is being used. The post-purchase authorization request may refer to a request to authorize a payment that has been made using the fuel card and may include, inter alia, a location of the POS device/system 114 and the quantity and price of product purchased. For a proprietary fuel card, the authorization request may include the pre-purchase authorization request and/or the post-purchase authorization request. However, for a non-proprietary fuel card the authorization request may be limited to the pre-purchase authorization request. For the non-proprietary fuel card, information regarding the amount and quantity of fuel purchased may be provided as a portion of the fuel card transaction data which may not be received in near real-time, rather, the fuel card transaction data may be received as batch data at a later time after purchase using the non-proprietary fuel card. In some embodiments, for the non-proprietary fuel card, the post purchase authorization request including the quantity of fuel purchased may be received in near real-time.

Upon receiving the authorization request, the transaction gateway 116 may validate the approval of the account associated with the fuel card. Further, the transaction gateway 116 may communicate with the fuel card server 118 to determine if the fuel card authorization request satisfies rules and regulations associated with the fuel card which may be stored in a database of the fuel card server 118. For example, the rules and regulations can include, inter alia, the number of purchases allowed in a day, the amount of fuel that may be purchased in each transaction, etc. If the account is approved and the rules and regulation criteria are satisfied, the POS device 114 may be instructed to authorize the fuel card 112 for a fuel purchase transaction.

Further, upon receiving the authorization request, the fuel card server 118 and/or the telematics server 106 may determine a location of the POS device 114 where the fuel card 112 is being used. In addition, the fuel card server 118 and/or the telematics server 106 may compare the location of the POS device 114 that is received from the authorization request with a location of the vehicle 102 that is received from the telematics device 104. If the locations do not substantially match, the fuel card server 118 and/or the telematics server 106 may generate and transmit an alert to the manager 110 in near real-time, wherein the alert identifies a fuel card usage exception.

In the case of a proprietary fuel card, the fuel card server 118 and/or the telematics server 106 may obtain the quantity of fuel purchased from the authorization request along with the location of the POS device 114. Further, the fuel card server 118 and/or the telematics server 106 may determine if the quantity of fuel purchased substantially matches an expected or actual difference between a first fuel level and second fuel level of the vehicle. If there is a mismatch, the fuel card server 118 and/or the telematics server 106 may generate and transmit an alert to the manager 110 in near real-time.

Once the fuel purchase event is completed, the POS device 114 may be configured to transmit the fuel card transaction data associated with the completed fuel purchase event. The POS device 114 may be configured to time stamp the fuel card transaction data representative of an approximate time of purchase or usage of the fuel card 112. In one embodiment, the POS device 114 may be configured to transmit the fuel card transaction data to the transaction gateway 116, which in turn may transmit it to the fuel card server 118. In another embodiment, the POS device 114 may be configured to transmit the fuel card transaction data directly to the fuel card server 118. The fuel card transaction data may be transmitted in the form of batch data at a later time after the transaction using the fuel card is completed, for example at the end of day or after several days.

As illustrated in FIG. 1, the fuel card server 118 may be communicatively coupled to the transaction gateway 116 and/or the POS device 114 and configured to receive the fuel card transaction data from the POS device 114 as and when the fuel purchase event using the fuel card 112 is completed. In another embodiment, the fuel card server 118 may be configured to receive the fuel card transaction data in batches, e.g., daily, weekly, or monthly batch data. In either case, upon receiving the fuel card transaction data, the fuel card server 118 may be configured to store the received fuel card transaction data. Further, in one embodiment, the fuel card server 118 may be configured to receive the fuel level data and telematics data associated with the vehicle 102 from the telematics server 106. Upon receiving the fuel card transaction data, and the fuel level data and/or the telematics data, the fuel card server 118 may be configured to determine the occurrence of an exception associated with the fuel purchase event based on the received fuel level data, the telematics data and/or the fuel card transaction data. Further, if an exception is determined, the fuel card server 118 may be configured to generate an alert which may be transmitted to the computing device 160 associated with the user 110 (herein 'manager').

In another embodiment, upon receiving the fuel card transaction data, the fuel card server 118 may be configured to transmit the fuel card transaction data to the telematics server 106 and the exception may be determined in the telematics server 106. In yet another embodiment, as illustrated in FIG. 2, the fuel card server 118 may transmit the fuel card transaction data, and the telematics server 106 may transmit the fuel level data and/or the telematics data to a third party processing server 220 which may be configured to determining the occurrence of an exception associated with the fuel purchase event.

In the case of a proprietary fuel card, the fuel card transaction data may be used to verify the calculations and comparisons that were made using the authorization request received in near real-time. If calculations and comparisons that are made based on data from the authorization request does not match the calculations and comparisons that are made based on data from the fuel card transaction data, then the near real-time alert that is generated based on the authorization request may be updated to reflect the calculation and comparisons based on the fuel card transaction data. However, if the calculations and comparisons that are made based on data from the authorization request matches the calculations and comparisons that are made based on data from the fuel card transaction data, the no further action may be taken.

In the case of a non-proprietary fuel card, the near real-time alert may be limited to an alert that identifies if the location of the vehicle substantially matches the location where the fuel card is being used. Further, a fuel level based alert may be generated at a later time when the fuel transaction data is received which may not be in near real-time.

Turning to FIG. 2, this figure illustrates another example system for detection of fuel card usage exception, according to certain exemplary embodiments of the present invention. In particular FIG. 2 illustrates a vehicle 102, a telematics device 104, a telematics server 106, a network 108, a user 110, a user 120, a fuel card 112, a point of sale device 114, a transaction gateway 116, and a fuel card server 118, and a third party processing server 220.

The components illustrated in FIG. 2 are largely the same as those illustrated in FIG. 1, except for the third party processing server 220. Therefore, the description of FIG. 2 will be limited to the third party processing server 220 for sake of brevity. Specifically, instead of determining the exception associated with the fuel purchase event at the fuel card server 118 and/or the telematics server 106, in the example system illustrated in FIG. 2, the determination may be made at the third party processing server 220. Accordingly, the fuel card server 118 may transmit the fuel card transaction data, and the telematics server 106 may transmit the fuel level data and/or the telematics data to the third party processing server 220 for further processing.

Now turning back to FIG. 1, in addition to detecting the occurrence of exceptions, the fuel card server 118 may also be configured to authorize the usage of the fuel card 112. Further, the fuel card server 118 may be configured to process the stored fuel card transaction data, and the fuel level data and/or the telematics data to determine a driving pattern and/or a pattern of fuel purchase associated with the vehicle 102. Furthermore, the fuel card server 118 may be configured to dynamically determine a near real-time fuel consumption of the vehicle 102, e.g., the gas mileage of the vehicle based on the fuel level data and/or the telematics data. In addition, the fuel card server 118 may be configured to pair the fuel card 112 with the vehicle 102 and/or the telematics device 104 associated with the vehicle 102.

In one example embodiment, the fuel card server 118 may be associated with one business entity, and the telematics server 106 and third party processing server 220 may be associated with partner businesses that are related to the one business entity. In another example embodiment, the telematics server 106, the fuel card server 118, and the third party processing server 220 may be associated with a single business entity. The fuel card server 118 may be described below in greater detail in association with FIG. 3.

Turning to FIG. 3, this figure illustrates a functional block diagram of the fuel card exception detection server, according to certain exemplary embodiments of the present invention. In particular, FIG. 3 illustrates an input engine 302, a fuel card association engine 304, the real-time mileage calculator engine 308, the fueling pattern calculator engine 310, the fuel exception detection engine 312, the fueling exception alert engine 314, the user interface engine 316, the authorization engine 318, the memory 320, the processor 322, the telematics and fuel card transaction repository 324 (herein 'repository'), the fuel fraud detection rules database 326 (herein 'rules database'), the fueling transaction and pattern database 328 (herein 'pattern database'), and the output engine 330.

In one embodiment, the fuel card server may include a processor 322. The processor 322 may be a multi-core processor. In another embodiment, the processor 322 may be a combination of multiple single core processors. In one embodiment, the fuel card server 118 can include a memory 320 coupled to the processor 322. The memory 320 may be non-transitory storage medium, in one embodiment, and a transitory medium in another embodiment. The memory 320 can include instructions that may be executed by the processor 322 to perform operations of the fuel card server 118. In other words, operations associated with the different engines of the fuel card server 118 may be executed using the processor 322.

In an exemplary embodiment, the fuel card server 118 may provide a web portal (e.g., web interface, hereinafter 'web interface') through which a user may access the fuel card server 118. In other words, the users can interact with the server using the web interface. The users authenticated to access the fuel card server 118 through the web portal may include a server administrator, manager 110, and/or application developers. The data stored in the fuel card server 118 may be accessed using an API associated with the fuel card server 118. For example, application developers may access the data stored in the fuel card server 118 using the API to develop applications based on the data stored in the fuel card server 118.

In one embodiment, the fuel card server 118 may be configured to display information available in the pattern database 328, the rules database 326, and/or the repository 324 through the web interface. Authorized users may be allowed to browse the data stored in the various databases of the fuel card server 118. In one embodiment, a manager 110 may have permission to edit the rules database, wherein the manager may add new rules and regulations associated with the authorization of the fuel card, delete existing rules and regulations and/or modify the stored rules and regulations. The said edit operations are representative examples and one of ordinary skill in the art can understand and appreciate that other appropriate edit operations may be available to a user without departing from the broader scope and sprit of the present invention In the exemplary embodiment, the fuel card server 118 can include an input engine 302. In one example embodiment, the input engine 302 can include a web interface module (not shown in Figure) that is associated with providing a web portal for users to access the fuel card server 118 for operations such as editing the rules database as described above.

Further, the input engine 302 may be configured to receive data from the telematics server 106, the computing device 160 associated with the manager 110, the transaction gateway 116 and/or the POS device 114. In addition, the input engine may be configured to receive data directly from the telematics device 104. Based on the type of data and the source of data, the input engine 302 may be configured to distribute the received data to other engines 304-318 and 330, and databases 324-328 of the fuel card server 118.

In one embodiment, the input engine 302 may receive fuel card transaction data from either the POS device 114 and/or the transaction gateway 116 which may be used to build/populate the repository 324. Upon receiving the fuel card transaction data, the input engine 302 may forward the fuel card transaction data to the processor 322 which in turn may process the fuel card transaction data (herein 'transaction data') and forward it to the fuel card association engine 304.

In an example embodiment, processing of the transaction data can include retrieving, from the transaction data, a unique identifier associated with the fuel card used for the transaction. In one embodiment, the unique identifier associated with the fuel card can include, inter alia, a fuel card number, an account identifier associated with the fuel card, etc. The type of unique identifier included in the transaction data may differ based on the POS device 114. For example, the transaction data from one POS device may include a both the fuel card number and the account number, whereas the transaction data from another POS device may include only the fuel card number or the account number. In one embodiment, the transaction data may be in a POS device specific format. Accordingly, processing the transaction data by the processor 322 may include converting a format of the transaction data from a POS device specific format to a format that is compatible with the operations of the fuel card server 118.

Upon receiving the processed transaction data, the fuel card association engine 304 may be configured to determine the vehicle 102, the driver 120 of the vehicle 102, and/or the telematics device 104 of the vehicle 102 (collectively referred to herein 'pairing elements') to which the transaction data is associated. To determine the association, the fuel card association engine 304 may compare the unique identifier associated with the fuel card against an association table (not shown in Figure) stored in the repository 324. The association table may include a mapping of the unique identifier associated with the fuel card to a unique identifier of one or more of the pairing elements. The association table may be generated by the fuel card association engine 302 responsive to pairing the fuel card 112 with one or more of the pairing elements. In one example embodiment, the fuel card 112 may be paired with one or more of the pairing elements initially when the manager 120 provides the fuel card 112 to the driver 120 of the vehicle 102, wherein the pairing may be done automatically and/or manually by either the driver 120 or the manager 110.

As described above, pairing the fuel card 112 may include mapping a unique identifier of the fuel card 112 with a unique identifier associated with either the computing device of the driver 120, the vehicle 102 and/or the telematics device 104. For example, the fuel card number may be mapped to a Vehicle Identifier Number (VIN) associated with the vehicle 102. In another example, the fuel card number may be mapped to a unique device number, such a manufacturer embedded code associated with the telematics device 104. In yet another example, the account number associated with the fuel card 112 may be mapped to an International Mobile Station Equipment Identifier (IMEI) number of a smart phone associated with the driver 120. In some example embodiments, one or more identifiers of the fuel card 112 may be mapped to a unique identifier (many-to-one) associated with either the computing device of the driver 120, the vehicle 102 and/or the telematics device 104 to account for the difference in transaction data based on the different POS devices 114.

On the basis of the comparison of the unique identifier associated with the fuel card (herein 'fuel card identifier') against the association table, the fuel card association engine 304 may be configured to determine the pairing element to which the fuel card is associated (for purposes of description the pairing element may be referred to as vehicle hereinafter). Upon determining the vehicle 102 to which the fuel card is paired, the fuel card association engine 304 may be configured to forward an identifier associated with the vehicle 102 (hereinafter 'vehicle identifier') and the transaction data to the fuel exception detection server 312.

The fuel exception detection engine 312 may be configured to determine the occurrence of an exception for each transaction data received at the fuel card server 118. In one embodiment, upon receiving the transaction data and the vehicle identifier, the fuel exception detection engine 312 may be configured to determine a timestamp associated with the transaction data, which may be embedded with the transaction data. The timestamp associated with the transaction data may identify a time associated with a purchase transaction using of the fuel card 112, for example a time of fuel purchase using the fuel card 112. Once the timestamp associated with the transaction data is determined, the fuel exception detection engine 312 may be configured to retrieve the fuel level data associated with the vehicle 102 that is paired to the fuel card 112. In one embodiment, the fuel exception detection engine 312 may be configured to obtain the fuel level data associated with vehicle 102 from the repository 324, provided the fuel level data is stored in the repository 324. If the fuel level data is not stored in the repository 324, the fuel exception detection engine 312 may be configured to request the fuel level data from the telematics server 106 and/or the telematics device 104 when needed.

In particular, the fuel exception detection engine 312 may be configured to retrieve a first fuel level data that is representative of an amount of fuel present in the fuel tank of the vehicle (hereinafter 'fuel level of the vehicle') at a time before a time associated with a purchase transaction using the fuel card 112 (hereinafter 'fuel purchase event'). In addition, the fuel exception detection engine 312 may be configured to retrieve a second fuel level data that is representative of a fuel level of the vehicle at a time after the fuel purchase event.

The first and second fuel level data may be retrieved by comparing the timestamps of the fuel level data with the timestamp associated with the transaction data. For example, a driver 120 may use the fuel card 112 to fill gas in Vehicle X. Responsive to using the fuel card 112 for fuel purchase, the fuel card server 118 may receive a transaction data associated with the fuel purchase using the fuel card 112. Upon receiving the transaction data, the fuel exception detection engine 312 may determine that the fuel card 112 is paired to Vehicle X. Further, the fuel exception detection engine 312 may retrieve a timestamp associated with the transaction data. If the timestamp on the transaction data indicates the time of purchase as 5:30 pm and a date of purchase as Day Y, then the fuel exception detection engine 312 may be configured to retrieve a first fuel level data and a second fuel level data associated with the Vehicle X based on the timestamp of the transaction data. In the said example, the first and the second fuel level data may be retrieved by searching for all fuel level data associated with Vehicle X that have a timestamp within a 5 minute interval before and after 5:30 pm on Day Y, for example from 5:25 pm to 5:35 pm on Day Y.

In addition the first fuel level data and the second fuel level data, the fuel exception detection engine 312 may be configured to determine the quantity of item, such as fuel purchased using the fuel card 112, wherein the quantity of fuel purchased may be determined based on the transaction data. Once the first fuel level data, the second fuel level data, and the quantity of fuel purchased are obtained, the fuel exception detection engine 312 may be configured to detect the occurrence of an exception associated with the fuel purchase. In one embodiment, the fuel exception detection engine 312 may be configured to detect an exception by determining if the quantity of fuel purchased is greater than a fuel capacity of fuel tank of vehicle 102. In another embodiment, the fuel exception detection engine 312 may be configured to detect an exception by determining that the fuel exception detection engine 312 may be configured to determine if the difference in fuel level before and after purchase of fuel using the fuel card 112 matches the quantity of fuel purchased. In yet another embodiment, the fuel exception detection engine 312 may be configured to detect an exception based on the timestamp associated with the transaction data, the first fuel level data and the second fuel level data. In an additional embodiment, the fuel exception detection engine 312 may be configured to detect an exception based on the location of the vehicle 102 at the time of fuel purchase.

Further, in one embodiment the fuel exception detection engine 312 may be configured to detect a fuel purchase associated with vehicle 102 using a payment card other than the fuel card 112. For example, if the fuel level of Vehicle X at 5:25 pm is 2 gallons and the fuel level of vehicle X at 5:35 pm is 8 gallons, and no transaction data is available between 5:25 pm and 5:35 pm, then the fuel exception detection engine 312 may determine that Vehicle X has been refueled using a payment card other than the fuel card 112. Various processes of detection of the exception will be described below in greater detail in association with FIGS. 4-8. In one example embodiment, the different exceptions may be implemented in the form of rules which may be stored in the rules database 326 along with the fuel card authorization rules. In one or more embodiments, the stored exception rules may be used by the fuel exception detection engine 312 to determine the occurrence of the exception.

Once a fuel card usage exception is detected, the fuel exception detection engine 312 may communicate with the fuel exception alert engine 314 to generate an alert identifying the occurrence of the exception, which may then be transmitted for presentation via the output engine 330. The transmitted alert may be presented to a user, such as manager 110 by a computing device 160 associated with the manager 110 through a visual, auditory, and/or tactile means. In one example embodiment, the alert may be a signal. In another example, the alert may be in the form of a report which may include presentations that are numerical, analytical, graphical, and so on. One of ordinary skill in the art can understand and appreciate that the alert can take any appropriate format as preferred by the user without departing from a broader scope of the disclosure.

Referring back to the fuel card association engine 304, in an additional example embodiment, the fuel card association engine 304 may be configured to categorize the transaction data based on various factors such as the associated component to which the fuel card associated with the transaction data is mapped, the timestamp on the transaction data, the unique identifier of the fuel card associated with the transaction data, and so on. The process may be repeated for each transaction data that is received at the fuel card server 118 and the repository 324 may be updated each time.

Now referring back to the input engine 302, in addition to the transaction data, the input engine 302 may be configured to receive the fuel level data and/or the telematics data from the telematics server 106. In one embodiment, the fuel level data and/or the telematics data received at the input engine 302 may be pre-formatted and processed at the telematics server 106. If the fuel level data and/or telematics data has been pre-formatted and processed, then the input engine 302 may store the received fuel level data and/or the telematics data in the repository 324.

In some embodiments, the input engine 302 may be configured to receive the fuel level data and/or the telematics data directly from the telematics device 104 in which case the data may not be pre-formatted and processed. In said embodiment, the input engine 302 may be configured to forward the fuel level data and/or the telematics data to the processor 322 for formatting and processing. Accordingly, the processor 322 may be configured to format, categorize and store the received fuel level data and/or the telematics data in the repository 324. Similar to the transaction data, the categorization of the received fuel level data and/or the telematics data may be based on one or more factors such as timestamp associated with the data, unique identifiers associated with the data, and so on.

In one example embodiment, the repository 324 may be a one dimensional database or a multi-dimensional database. As described above, the repository 324 may be configured to store the association tables, fuel level data, telematics data, and the received transaction data. One of ordinary skill in the art can understand and appreciate that the type of the database, and the data stored in the repository may be varied as desired without departing from the broader spirit of the disclosure.

Referring back to the input engine 302 once again, in addition to receiving the fuel transaction data, the fuel level data and the telematics data, the input engine 302 may be configured to receive an authorization request from the transaction gateway 116 and/or the POS device 114. Upon receiving the authorization request, the input engine 302 may forward the authorization request to the authorization engine 318 which in turn may be configured to authorize or reject the authorization request. The determination may be made by comparison of the authorization request against a set of rules associated with the fuel card 112, wherein the rules are stored in the rules database 326. A representative example of a rule can include a number of times the fuel card 112 is allowed to be used in a day. For example, if the rules state that the fuel card 112 cannot be used for more than five transactions in a day and the authorization engine 318 determines that the received authorization request corresponds to sixth transaction associated with the fuel card 112, then the authorization engine 318 may reject the authorization request. If not, the authorization engine 318 may accept the authorization request and update the number of transactions associated with the fuel card in the rules database 326 for future calculations. One of ordinary skill in the art can understand and appreciate that the rules database can include any appropriate type and number of rules without departing from the broader spirit of the disclosure. Further, in addition to the transaction authorization rules, the rules database 326 may include other fuel card usage exception determination rules which will be described below in greater detail.

As illustrated in FIG. 3, the fuel card server 118 may also include a real-time gas mileage calculator engine 308 (herein 'gas mileage engine'). The gas mileage engine 308 may be configured to dynamically calculate the gas mileage associated with the vehicle 102 based fuel level data and telematics data associated with the vehicle. In one embodiment, the gas mileage engine 308 may be configured to calculate the gas mileage of a vehicle upon receiving a request for the gas mileage of the vehicle 102. In another embodiment, the gas mileage engine 308 be configured to automatically calculate the gas mileage of a vehicle at regular intervals. In one example, the gas mileage associated with the vehicle 102 may be calculated based on the fuel consumed by the vehicle between two points in time and the distance travelled by the vehicle between said two points in time. In particular, the fuel consumed between two points in time may be calculated based on the fuel level data of the vehicle and the associated timestamp. Further, the distance travelled may be calculated based on the telematics data of the vehicle, which may include location of the vehicle. In addition, the gas mileage engine 308 may be configured to determine an estimate fuel level of the vehicle at a certain time and/or distance based on the calculated gas mileage of the vehicle, provided a speed of the vehicle is available to the gas mileage engine 308.

The fuel card server 118 may also include a fueling pattern calculator engine 310 (herein 'pattern engine 310'). The pattern engine 310 may be configured to determine any appropriate pattern characteristic of a driver in association with the operation of the vehicle 102. In one example embodiment, the pattern engine 310 may be configured to analyze a plurality of recordings of the fuel level data, the telematics data, and/or the transaction data to determine a pattern of using the fuel card 112 by a driver 120, such as a pattern of refueling the vehicle using the fuel card 112. In another example embodiment, the pattern engine 310 may be configured to determine a pattern of driving the vehicle 102 by the driver 120. In an additional example embodiment, the pattern analyzer 310 may be configured to determine a pattern, wherein the fuel level of the vehicle 102 may be charted against time of operation of the vehicle 102 and/or distance travelled by the vehicle 102. The pattern may be determined for each vehicle 102 and each driver 120 of the vehicle 102.

Once the pattern is determined, the pattern engine 310 may be configured to forward the pattern to the fuel exception detection engine 312 which in turn may be configured to determine if a current transaction data and/or the current fuel level data approximately follows the pattern. If the current data does not follow the pattern, then the fuel exception detection engine 312 may communicate with the fuel exception alert engine 314 to generate an alert identifying an exception.

Turning now to FIGS. 4-8, these figures include flow charts that illustrate the process for detecting a fuel card usage exception. Although specific operations are disclosed in the flowcharts illustrated in FIGS. 4-8, such operations are exemplary. That is, embodiments of the present invention are well suited to performing various other operations or variations of the operations recited in the flowcharts. It is appreciated that the operations in the flowcharts illustrated in FIGS. 4-8 may be performed in an order different than presented, and that not all of the operations in the flowcharts may be performed.

All, or a portion of, the embodiments described by the flowcharts illustrated in FIGS. 4-8 can be implemented using computer-readable and computer-executable instructions which reside, for example, in computer-usable media of a computer system or like device. As described above, certain processes and operations of the present invention are realized, in one embodiment, as a series of instructions (e.g., software programs) that reside within computer readable memory of a computer system and are executed by the processor of the computer system. When executed, the instructions cause the computer system to implement the functionality of the present invention as described below.

Figure 4A:
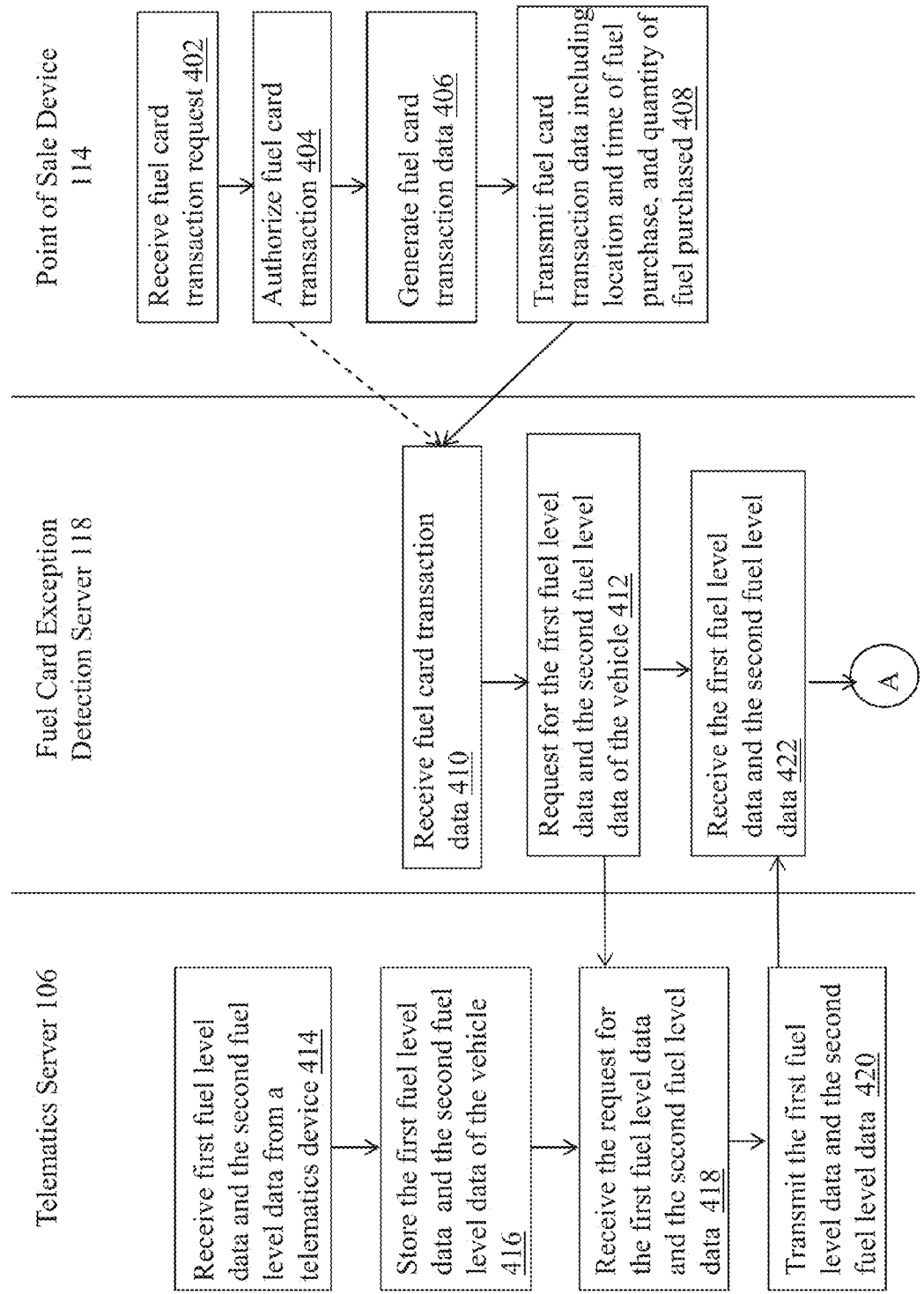
FIGS. 4A and 4B (collectively 'FIG. 4') is a flow chart that illustrates a process of detecting a fuel card usage exception, according to certain exemplary embodiments of the present invention.
Figure 4B:
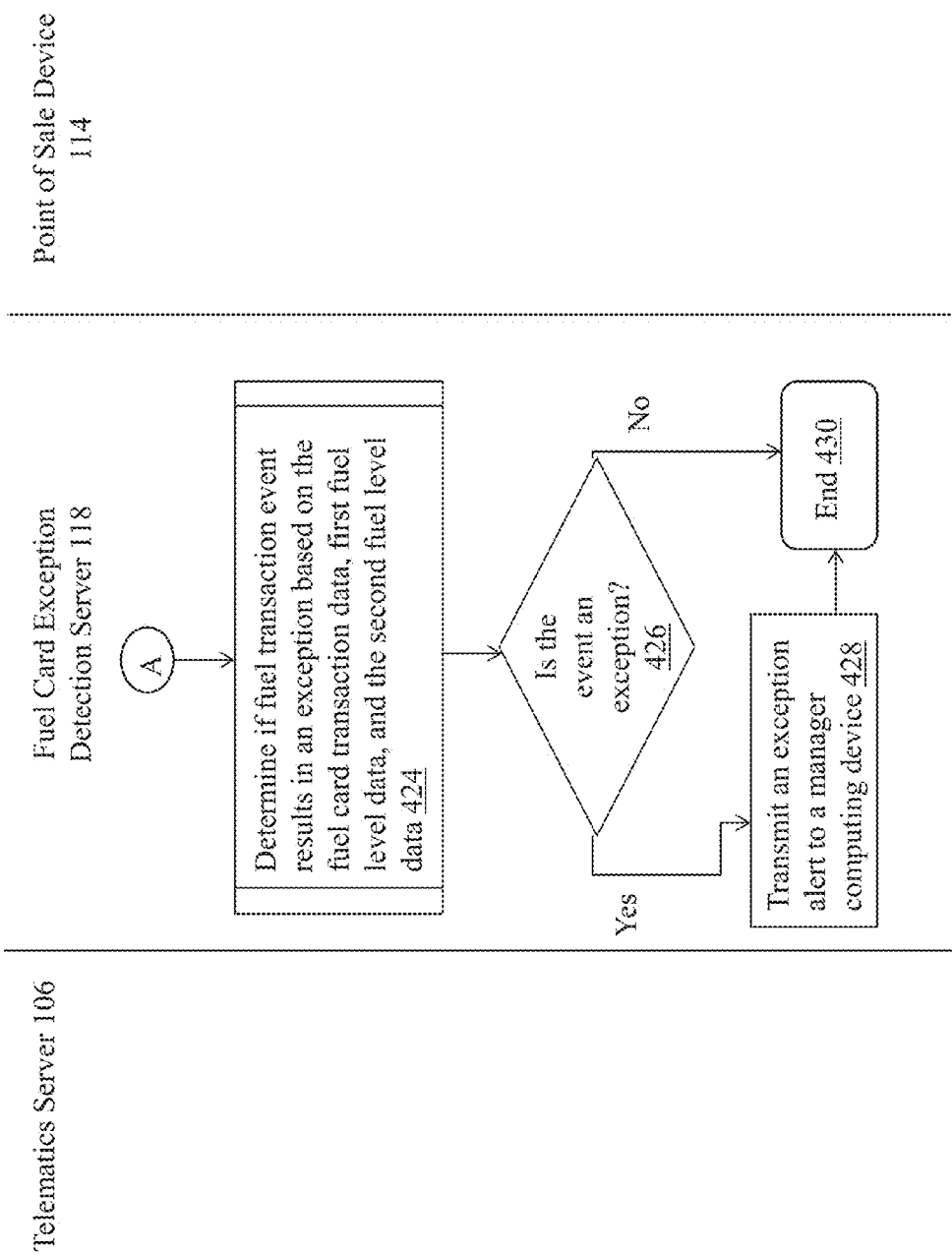

Turning to FIG. 4 (FIGS. 4A and 4B), this figure is a flow chart that illustrates a process of detecting a fuel card usage exception, according to certain exemplary embodiments of the present invention. In operation 402, the driver 120 may use the fuel card 112 at a POS device 114 for a purchase, e.g., purchase of fuel for the vehicle 102. Upon using the fuel card for the purchase, in operation 404, the POS device 114 may generate an authorization request to confirm that the current transaction using the fuel card 112 is acceptable. Further, in operation 404, the POS device 114 may transmit the authorization request to a transaction gateway 116, wherein the transaction gateway may accept or reject the authorization of the transaction using the fuel card 112 based on approval of an account associated with the fuel card 112. In addition, the transaction gateway 116 may transmit the authorization request to the fuel card server 118 to check if the current transaction using the fuel card 112 satisfies rules associated with the fuel card 112.

For a proprietary fuel card, the authorization request may include, inter alia, a location of the POS device 114 where the fuel card 112 is being used, a quantity of product (e.g., fuel) purchased using the fuel card, and/or a unique identifier associated with the fuel card 112 (herein 'fuel card identifier'). For a non-proprietary fuel card, the authorization request may include, inter alia, a location of the POS device 114 where the fuel card 112 is being used, and/or the fuel card identifier. Further, on the basis of the authorization request, the fuel card server 118 may generate near real-time alerts that identify a fuel card usage exception. The generation of near real-time alerts may be described in greater detail below, in association with FIGS. 10-11.

In operation 404, if the current transaction satisfies the rules, then the fuel card server 118 may accept the authorization request and a response may be transmitted back to the POS device 114 indicating that the transaction is authorized. In some embodiments, the rules associated with a use of the fuel card 112 may be stored in the transaction gateway 116 and accordingly, the transaction gateway 116 may check if the current transaction satisfies the rules associated with the fuel card 112. On the basis of the authorization from the transaction gateway 116 and/or the fuel card server 118, in operation 404, the POS device 114 may accept the current transaction for purchase using the fuel card 112. Once the current transaction using the fuel card 112 is authorized, in operation 406, the POS device 114 may generate a transaction data comprising at least the fuel card identifier, a timestamp identifying a time of the current transaction (fuel purchase), a location of the current transaction (fuel purchase), cost of fuel purchased, and a quantity of the fuel purchased in the current transaction using the fuel card 112. Further, the POS device 114 may be configured to transmit the transaction data to the fuel card server 118 either directly or indirectly via the transaction gateway 116.

In some embodiments, the POS device 114 may transmit the transaction data to the fuel card server 118 as batch data. For example the POS device 114 may collect transaction data and transmit it at the end of each day. In operation 410, the fuel card server 118 may be configured to receive the transaction data either in the form of batch data or in near real-time. Upon receiving the transaction data, the fuel card server 118 may determine the vehicle 102 to which the fuel card 112 is paired based on the fuel card identifier included in the transaction data. Further, in operation 412, the fuel card server 118 may generate a request for a first fuel level of the vehicle 102 and a second fuel level of the vehicle 102, wherein the first and second fuel level of the vehicle 102 identifies a fuel level of the vehicle at a time prior to the fuel purchase and after the fuel purchase respectively. In one example embodiment, the fuel card server may determine a time of fuel purchase based on the timestamp associated with the transaction data and accordingly the fuel card server 118 may request for the first fuel level data and the second fuel level data based on the timestamp associated with transaction data. In one embodiment, the request for the first fuel level data and the second fuel level data may be transmitted to the telematics server 106. Alternatively, in some embodiment, the request for the first fuel level data and the second fuel level data may be transmitted directly to the telematics device 104 associated with the vehicle 102.

In operation 418, the telematics server 106 may receive the request for the first fuel level data and the second fuel level data of the vehicle 102. As illustrated in FIG. 4A, in operation 414, the telematics server 106 may receive the first fuel level data and the second fuel level data of the vehicle 102 from the telematics device 104 associated with the vehicle 102. In addition to the first and second fuel level data, in operation 414, the telematics server 106 may also obtain the telematics data from the telematics device 104 associated with the vehicle 102. After receiving the first fuel level data, second fuel level data, and the telematics data, in operation 416, the telematics server 106 may store the received data.

In one embodiment, the telematics sever 106 may request the telematics device 104 to provide the telematics data, the first fuel level data, and/or the second fuel level data. In another embodiment, the telematics device 104 may be configured to automatically transmit the first and second fuel level data, and the telematics data associated with the vehicle to the telematics server 106 at regular intervals. For example, the telematics device 104 may be configured to transmit data to the telematics server 106 every 5 minutes. In another example, the telematics device 104 may be configured to transmit data to the telematics server 106 each time the vehicle covers 10 miles distance. In yet another embodiment, the telematics device 104 may be configured to transmit the first fuel level data, the second fuel level data, and the telematics data to the telematics server 106 based on pre-set triggers which will be described in greater detail below in association with FIG. 5.

Upon receiving the request, in operation 420, the telematics server 106 may be configured to retrieve the requested first fuel level data and the second fuel level data of the vehicle 102. Further, in operation 420, the telematics server 106 may be configured to transmit the first fuel level data and the second fuel level data of the vehicle 102 to the fuel card server 118. In addition to the first and second fuel level data, in some embodiments, the telematics server 106 may also transmit the telematics data associated with the vehicle 102 to the fuel card server 118. In operation 422, the fuel card server 118 may receive the first and second fuel level data. Further, upon receiving the first and second fuel level data, in operation 424, the fuel card server 118 may determine if the current transaction of the fuel card 112 (e.g., fuel purchase transaction) results in an exception based on the first fuel level data, second fuel level data, associated with the vehicle 102. Operation 424 will be described in greater detail below, in association with FIGS. 6-8.

Figure 6A:
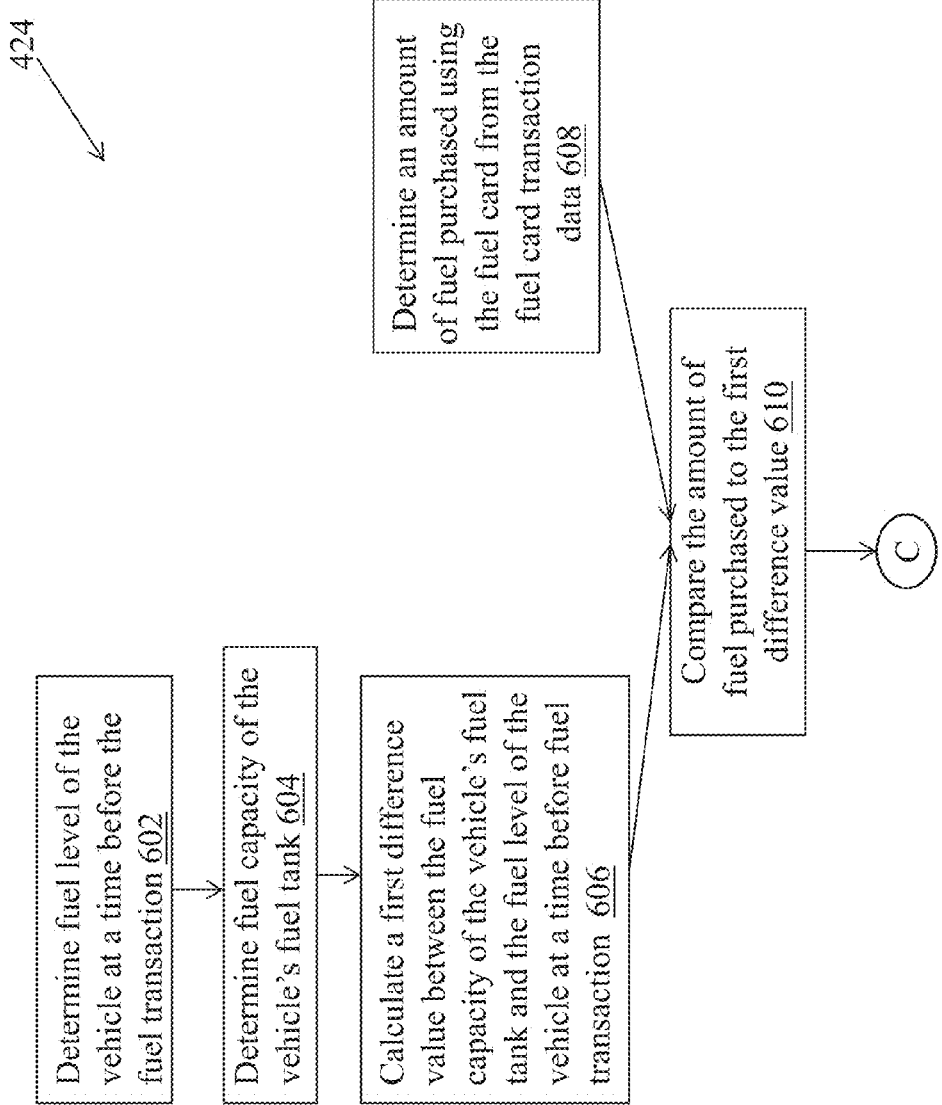
FIGS. 6A and 6B (collectively 'FIG. 6') is a flow chart that illustrates a process of determining a fuel card usage exception, according to certain exemplary embodiments of the present invention.
Figure 6B:
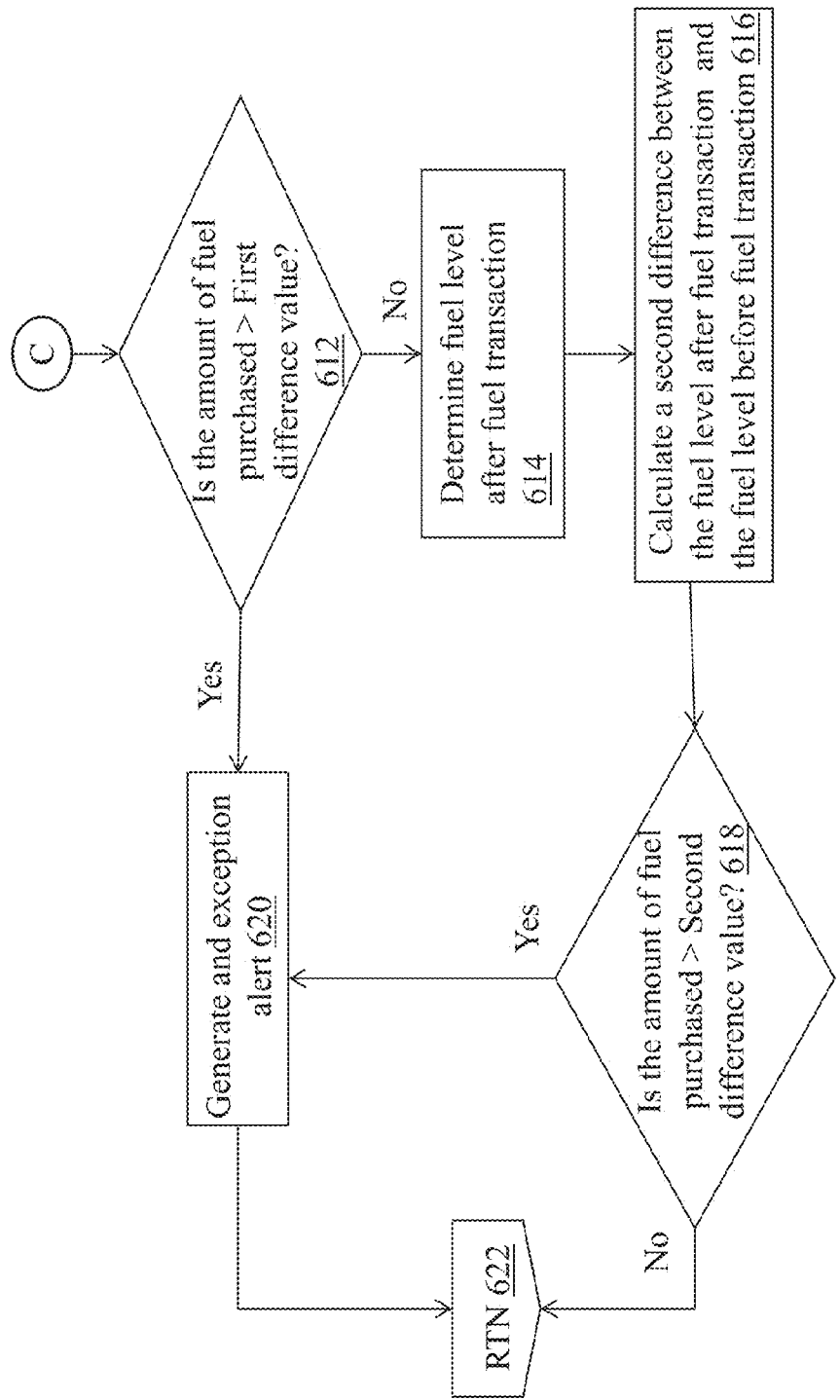

Now turning to FIG. 6, this figure is a flow chart that illustrates a process of determining a fuel card usage exception, according to certain exemplary embodiments of the present invention. As described above, the fuel card server 118 may receive the first fuel level data and the second fuel level data of the vehicle 102. In operation 602, the fuel card exception detection engine 312 (herein 'exception engine 312') of the fuel card server 118 may determine the fuel level of the vehicle 102 at a time prior to the time of the fuel purchase using the fuel card 112 based on the first fuel level data of the vehicle 102. Further, in operation 604, the exception engine 604 may determine a fuel capacity of the vehicle's fuel tank. In one embodiment, such data may be pre-stored in the fuel card server 118. In another embodiment, the fuel card server 118 may communicate with an external database associated with the vehicle manufacturer or a third-party database to retrieve said data associated with the fuel capacity of the vehicle's fuel tank.

After determining the fuel capacity of the vehicle's fuel tank and the fuel level of the vehicle 102 prior to a fuel purchase using the fuel card 112, in operation 606, the exception engine 312 may calculate a first difference value between the fuel capacity of the vehicle's fuel tank and the fuel level of the vehicle 102 prior to fuel purchase. In other words, the exception engine 312 determines a quantity of fuel needed to fill the vehicle's fuel tank minus the quantity of fuel already present in the vehicle's fuel tank. Further, in operation 608, the exception engine 312 may determine the quantity of fuel purchased using the fuel card 112 based on the transaction data.

Once the first difference value and the quantity of fuel purchased is determined, in operations 610 and 612, the exception engine 312 determines if the quantity of fuel purchased is greater than the first difference value. If the quantity of fuel purchased is greater than the first difference value, i.e., if the quantity of fuel purchased is greater than an empty volume of the vehicle's fuel tank, then, in operation 620, the exception engine 312 may be configured to generate an alert identifying an exception in the fuel purchase using the fuel card 112. However, if the quantity of the fuel purchased is not greater than the first difference value, then, in operation 614, the exception engine 312 may determine a fuel level of the vehicle 102 at a time after the fuel purchase using the fuel card 112 based on the second fuel level data of the vehicle 102.

Further, in operation 616, the exception engine 312 may calculate a second difference value between the fuel level of the vehicle 102 after the fuel purchase and the fuel level of the vehicle 102 prior to the fuel purchase. Once the second difference is determined, in operation 618, the exception engine 312 may determine if the quantity of fuel purchased is greater than the second difference value. In other words, in operation 618, the exception engine may determine if the difference in fuel level after and before purchase of the fuel is approximately equal to the quantity of fuel purchased using the fuel card. If the quantity of fuel purchased is greater than the second difference value, then, in operation 620, the exception engine 312 may generate an alert identifying an exception associated with the fuel purchase. However, if the quantity of fuel purchased is not greater than the second difference value, i.e., the quantity of fuel purchased is less than or approximately equal to the second difference value, then in operation 622 the exception engine 312 may return to operation 428 in FIG. 4. In some embodiments, if the quantity of fuel purchased is less than the second difference value, then the exception engine 312 may determine that the driver 120 may be have used a payment card other than the fuel card 112 to purchase fuel, and accordingly generate an alert identifying an exception associated with the fuel purchase.

In one example, the fuel capacity of the vehicle's fuel tank is 12 gallons. Continuing with the example, based on the first and second fuel level data, the exception engine 312 may determine that the fuel level of the vehicle prior to fuel purchase is 2 gallons and the fuel level of the vehicle after fuel purchase is 6 gallons. Then, the exception engine 312 may determine if the amount of fuel purchased is greater than the first difference value between the fuel capacity of the vehicle and the fuel level prior to fuel purchase, which in said example is 10 gallons. If the amount of fuel purchased is 11 gallons, then the exception engine 312 may detect a fraud. However, if the amount of fuel purchased is less than the first difference value, then the exception engine 312 may calculate a second difference value between the fuel level after fuel purchase and fuel level before purchase, which is said example is 4 gallons. Suppose, the amount of fuel purchased is 7 gallons, then, the exception engine 312 may detect a fraud, but if the fuel purchased is 2 gallons, then the exception engine 312 may detect that the driver may have used another payment card. In said example, the exception engine 312 may allow a variation of +/−1 gallon to account for reading errors associated with the telematics device 104.

Figure 7A:
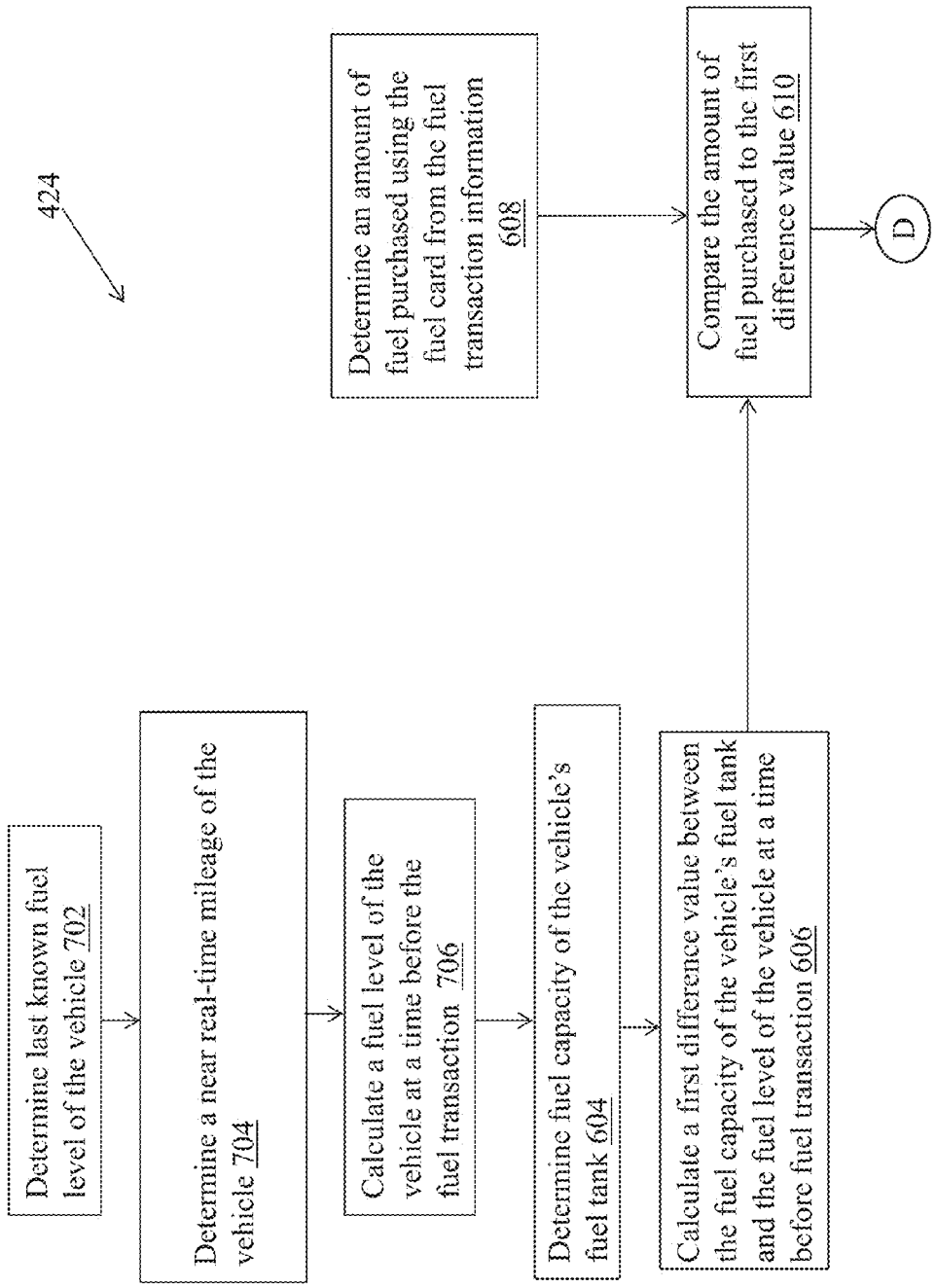
FIGS. 7A and 7B (collectively 'FIG. 7') is a flow chart that illustrates a process of determining a fuel card usage exception based on gas mileage of the vehicle, according to certain exemplary embodiments of the present invention.
Figure 7B:
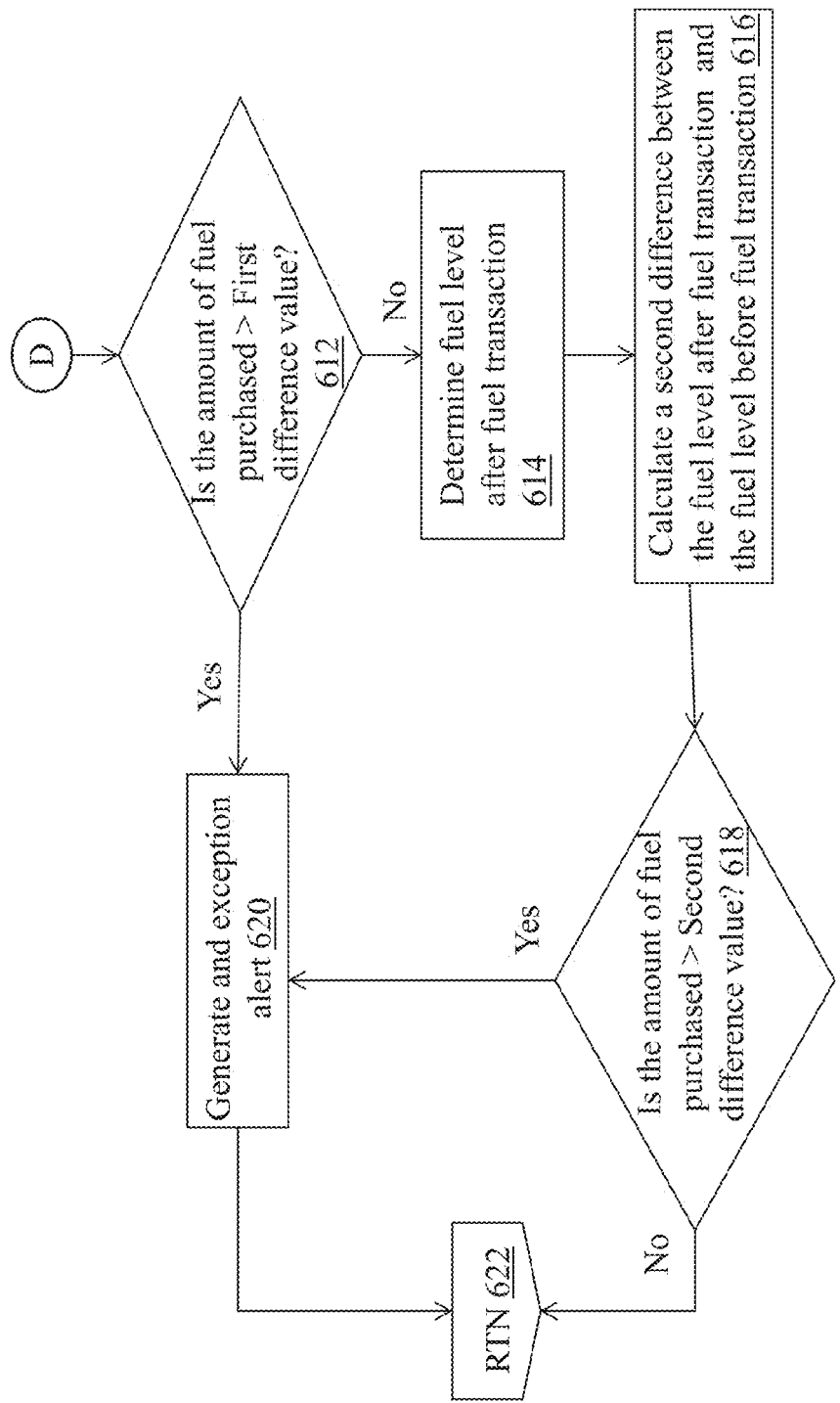

Turning now to FIG. 7, this figure is a flow chart that illustrates a process of determining a fuel card usage exception based on gas mileage of the vehicle, according to certain exemplary embodiments of the present invention. The operations illustrated in FIG. 7 are largely the same as those illustrated in FIG. 6, except for operations 702-706 where the fuel level of the vehicle 102 prior to the fuel purchase may be determined based on a gas mileage of the vehicle 102. Therefore, the description of FIG. 2 will be limited to the operations 702-706 for sake of brevity. In some embodiments, the fuel card server 118 may not receive a first fuel level data. For example, if a telematics device 104 is configured to transmit fuel level data of the vehicle 102 when the vehicle ignition is turned on and/or off, and a driver 120 does not turn off the ignition of the vehicle during fuel purchase, then the telematics device 104 may not transmit a fuel level data of the vehicle 102. Accordingly, in said example, the fuel card server 118 and/or the telematics server 106 may not have a first fuel level data of the vehicle. In said embodiment where the fuel level data of a vehicle is unavailable to the fuel card server 118, the exception engine 312 may use the gas mileage of the vehicle 102 to determine exceptions associated with a fuel purchase.

In operation 702, the exception engine 312 may determine the last known fuel level of the vehicle 102. Further, in operation 702 the exception engine 312 may retrieve telematics data associated with the vehicle 102 that was obtained at a time that is within a threshold time interval prior to the time of fuel purchase. For example, the exception engine 312 may request the telematics server 106 to provide all telematics data of the vehicle 102 that has a timestamp indicating a time between 5:20 pm and 5:30 pm, provided the time of fuel purchase is 5:30 pm. As described earlier, the time associated with the telematics data and the fuel purchase may be determined based on the timestamps associated with the telematics data and the transaction data respectively. Once the telematics data is obtained, in operation 702, the exception engine 312 may determine a distance travelled by the vehicle 102 from a time associated with the last known fuel level reading to the time associated with the telematics data.

Then, in operation 704, the exception engine 312 may determine a near real-time mileage of the vehicle based on previous recordings of the fuel level data and the telematics data. For example, the exception engine 312 may retrieve successive fuel level data of the vehicle, i.e., fuel level 1 at time t1, fuel level 2 at time t2, and fuel level 3 at time t3. Further, in said example, the location of the vehicle at time t1, t2, and t3 may be obtained based on telematics data. Once the fuel level and the location of the vehicle is obtained, the exception engine 312 may calculate the ratio of fuel consumed to the distance travelled to determine a near real-time gas mileage. In another embodiment, the exception engine 312 may receive the gas mileage associated with the vehicle from a third party database or a vehicle manufacturers database.

In either case, upon receiving the gas mileage of the vehicle 102, the last known fuel level of the vehicle, and the distance travelled by the vehicle, the exception engine 312 may determine an approximate fuel level of the vehicle prior to the fuel purchase, in operation 706. For example, consider that the last known fuel level reading was 6 gallons and the time of recording of the last known fuel level is 3:30 pm on day X. Further, in said example, consider the gas mileage of the vehicle is 1 mile/gallon. In addition, consider that based on a telematics data of the vehicle recorded at 5:29 pm on Day X the distance travelled by the vehicle from 3:30 pm to 5:29 pm is determined to be 3 miles. Accordingly, in said example, the exception engine 312 may determine that the fuel level of the vehicle at 5:29 pm, which is prior to the time of fuel purchase, may approximately be 3 gallons. In one embodiment, the distance travelled may be directly provided by the telematics data. In another embodiment, the distance travelled may be calculated based on an average speed of the vehicle and the time. In some embodiments, similarly, the exception engine 312 may calculate the fuel level data of the vehicle after fuel purchase based on the gas-mileage of the vehicle and the last known fuel level.

Once the fuel level of the vehicle 102 before fuel purchase and after fuel purchase is determined, the exception engine 312 may determine exception associated with the fuel purchase through operations 606-622 which is described above in association with FIG. 6 and may not be repeated for sake of brevity.

Figure 8:
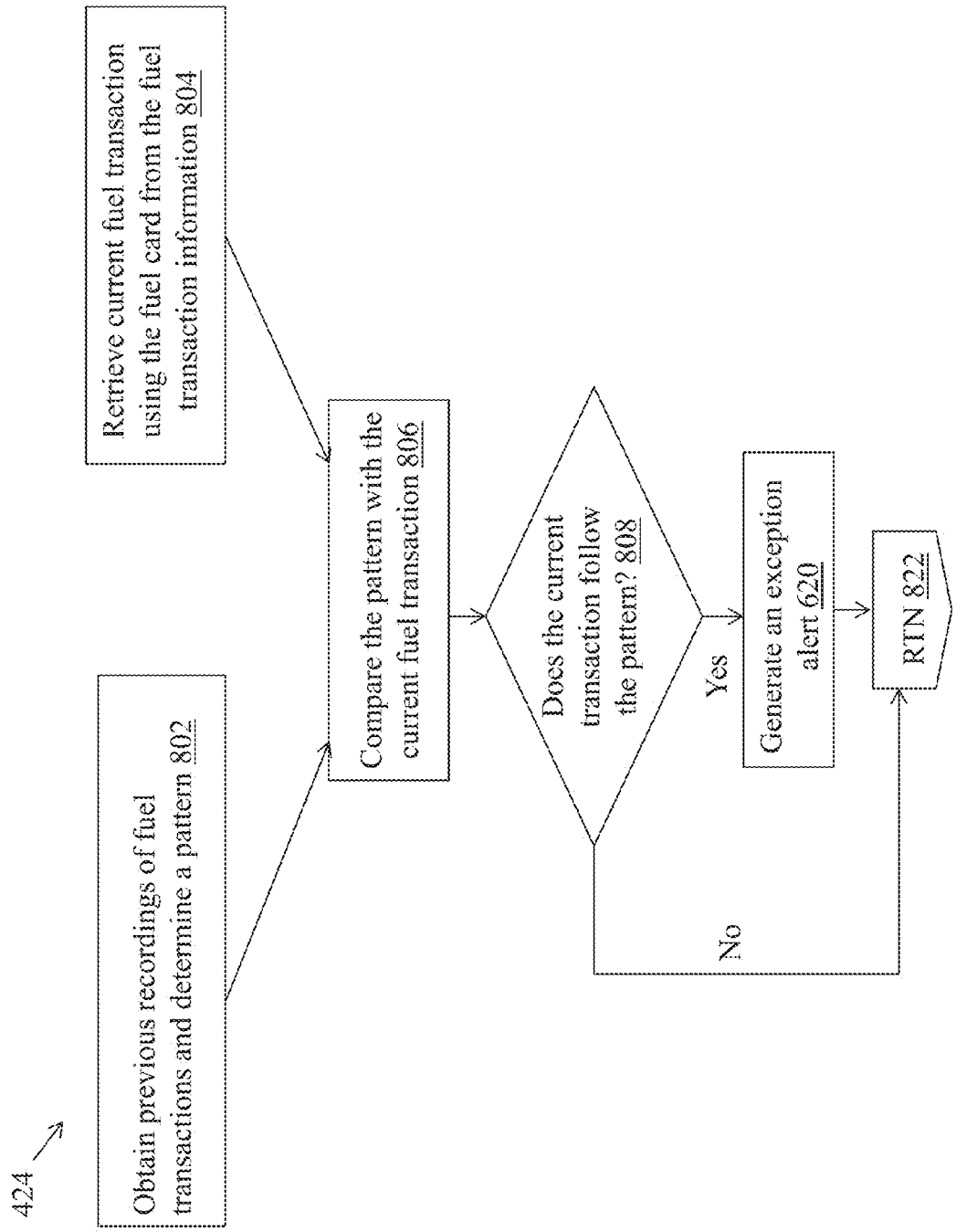
FIG. 8 is a flow chart that illustrates a process of determining a fuel card usage exception based on patterns associated with driving and fueling records, according to certain exemplary embodiments of the present invention.

Now turning to FIG. 8, this figure is a flow chart that illustrates a process of determining a fuel card usage exception based on patterns associated with driving and fueling records, according to certain exemplary embodiments of the present invention. In operation 802, the pattern engine 310 of the fuel card server 118 may retrieve a plurality of recordings of the transaction data and the telematics data. In an example embodiment, the recordings may be previous fuel level readings, and telematics data associated with a vehicle that is stored in the either the telematics server 106 and/or the repository 324 of the fuel card server 118. Further, the pattern engine 310 may analyze the plurality of recordings and determine, for each driver 120, a pattern associated with using the fuel card 112, such as for refueling the vehicle 102. In one example embodiment, the pattern may be repetitive and an established pattern, whereas in another example embodiment, the observations may be not result in a pattern and may be random. An example pattern may be described in greater detail below, in association with FIG. 9.

Figure 9:
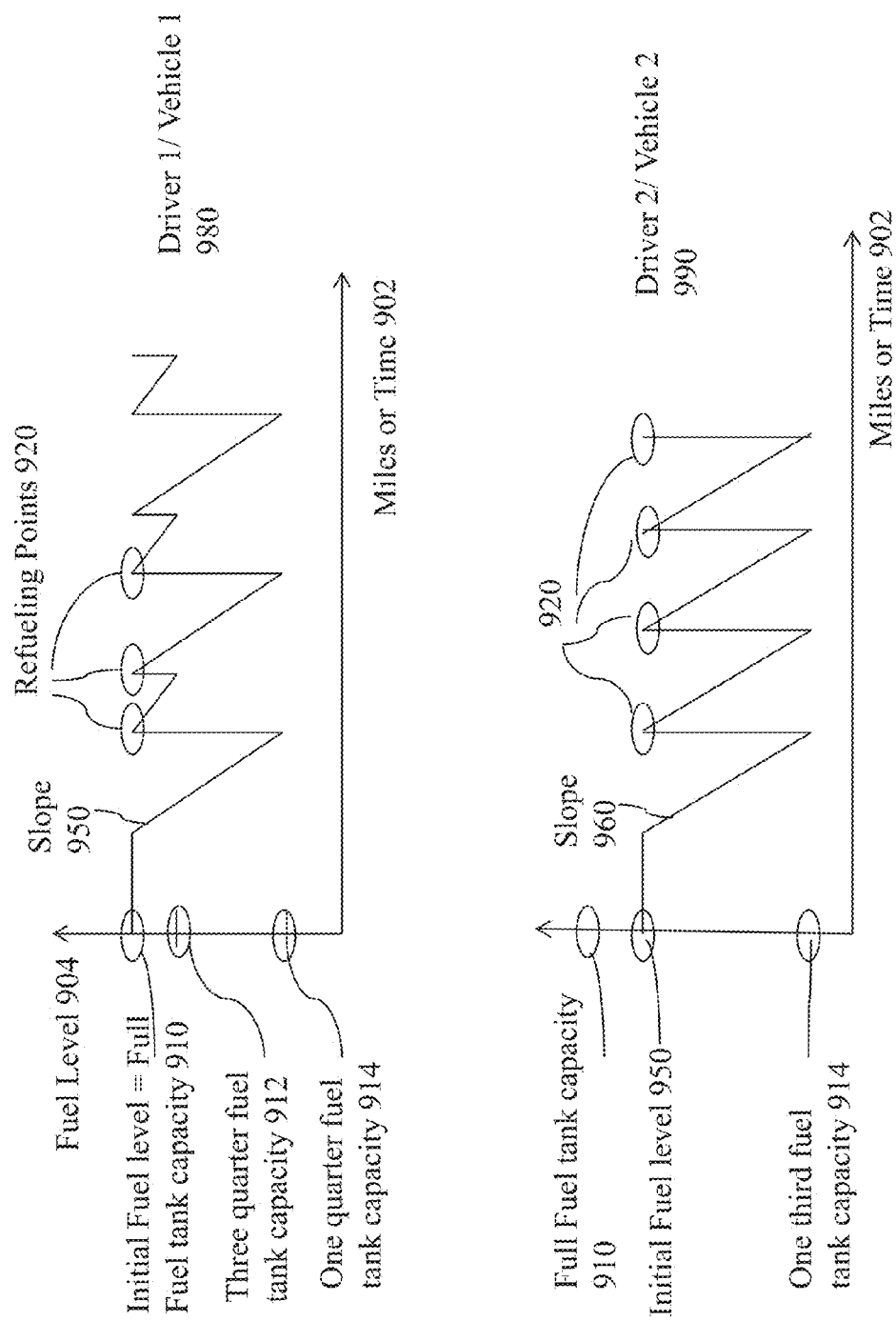
FIG. 9 illustrates a graphical representation of a fuelling and driving pattern associated with a vehicle and/or driver of the vehicle, according to certain exemplary embodiments of the present invention.

Turning to FIG. 9, this figure illustrates a graphical representation of a fueling and driving pattern associated with a vehicle and/or driver of the vehicle, according to certain exemplary embodiments of the present invention. In particular, FIG. 9 illustrates a pattern associated with a first driver for a first vehicle 980 and a pattern associated with a second driver for a second vehicle 990.

In one example embodiment, the example patterns 980 and 990 of FIG. 9 illustrate a graph in which the fuel level of a vehicle is plotted against time and/or distance travelled by the vehicle. One of ordinary skills can understand and appreciate that the graphs are an example representation of the pattern for purposes of the description, and said example representation do not limit the scope of the pattern. Accordingly, in some embodiments, the pattern may be a data pattern and may not be in the form of a graph.

In particular, the pattern 980 illustrates a graph, wherein the fuel level of the first vehicle is plotted against the distance travelled by the first vehicle while a first driver is driving the vehicle. Further, the pattern 980 illustrates refueling points 920 and based on the refueling points it can determined that the first driver refuels the vehicle every time the fuel level of the first vehicle has reached one-quarter of the vehicle's fuel tank capacity 914. The pattern 980 further illustrates that after refueling the first vehicle at one-quarter fuel level, the next refueling may be when the fuel level of the first vehicle is three quarters of the vehicle's fuel tank capacity 912. Each time, the first driver refuels the vehicle to a full fuel tank capacity. Similar observations may be made in pattern 990, where pattern 990 illustrates that the second driver follows a pattern of refueling the vehicle every time the fuel level of the second vehicle reaches one-third of the vehicle's fuel tank capacity. One of ordinary skill can understand and appreciate that the above-mentioned example patterns are not exhaustive, and numerous other patterns may be derived based on the telematics data, fuel level data, and the transaction data.

In addition to pattern of refueling followed by each driver, patterns 980 and 990 provide a pattern of gas mileage of the first and second vehicle respectively. In particular, slopes 950 and 960 may indicate a gas mileage of the first and second vehicle respectively, provided the graph illustrates a plot of fuel level against a distance. In the example embodiment illustrated in FIG. 9, slope 960 may be steeper than slope 950 which may indicate that the gas mileage of the second vehicle is lower than the gas mileage of the first vehicle.

As described above, a steeper slope may indicate that the vehicle has a lower gas mileage. In some embodiments, the gas mileage for a given vehicle may vary based on a style of driving of a particular driver associated with the vehicle, for example the driver may be an aggressive driver that does not drive within a speed range that provides highest gas mileage for the vehicle. In another embodiment, the gas mileage may vary based on various other factors, such as load carried by vehicle, a route travelled by the vehicle, a tire pressure of the vehicle's tires and so on. In yet another embodiment, the gas mileage of the vehicle may vary based on a condition of the vehicle, for example if the vehicle has not undergone maintenance in a long time, the gas mileage may be lower. Different patterns and rules associated with the patterns may be stored in the pattern database 328 of the fuel card server 118. In one example embodiment, the patterns may be identified by the pattern engine 310 and stored in the pattern database 328 prior to determination of an exception associated with the fuel card usage by the exception engine 312. One of ordinary skill in the art can understand and appreciate that the pattern may provide any appropriate analytical information associated with an operation of the vehicle and the use of the fuel card without departing from a broader spirit of the disclosure.

In one or more embodiments, the patterns may be used for detecting exceptions associated with the use of the fuel card as described in FIG. 8. Referring back to FIG. 8, once the pattern is determined based on the plurality of recording of the transaction data, fuel level data, and/or the telematics data, in operation 804, the exception engine 312 may retrieve transaction data associated with a current transaction using the fuel card 112.

Then, in operation 806, the exception engine 312 may compare the transaction data associated with the current transaction against the pattern. Further, in operation 808, the exception engine 312 may check if the transaction data associated with the current transaction follows the pattern. If the transaction data associated with the current transaction does not follow the pattern, then in operation 620, the exception engine 312 may generate an alert identifying an exception associated with the fuel purchase. For example, the transaction data may indicate that the driver purchased 6 gallons of fuel using the fuel card, and the pattern may indicate that the driver typically purchases 8 gallons. Accordingly, in said example, the exception engine 312 may detect an exception and generate an alert because the current transaction does not match or follow the pattern associated with a fuel purchase by the driver. In another example, the transaction data associated with the current transaction may indicate that the driver refueled his/her vehicle at 4:00 pm, but the pattern indicates that the driver typically refuels the vehicle at 12:00 noon. Accordingly, since the current transaction does not follow the pattern, the exception engine 312 may generate an alert. In another embodiment, a current gas mileage of the vehicle may be compared with a pattern associated with a gas mileage of the vehicle. If the current gas mileage value does not match a pattern of the gas mileage associated with the vehicle, then the exception engine 312 may generate an alert identifying an exception. One of ordinary skill in the art can understand and appreciate that the above-mentioned examples are not exhaustive, and any appropriate transaction data, telematics data, and/or fuel level data may be compared with the pattern for detecting an exception without departing from the broader spirit of the disclosure.

Once the alert is generated, in operation 822, the exception engine 312 may return to operation 428 of FIG. 4. Accordingly, turning back to FIG. 4, once it is determined that the current transaction using the fuel card 112 is an exception and an alert is generated, in operation 428, the fuel card server 118 may transmit the alert to a computing device 160 associated with the manager 110 and the process ends at operation 430. Further, the process also ends when the current transaction is not an exception.

Figure 5A:
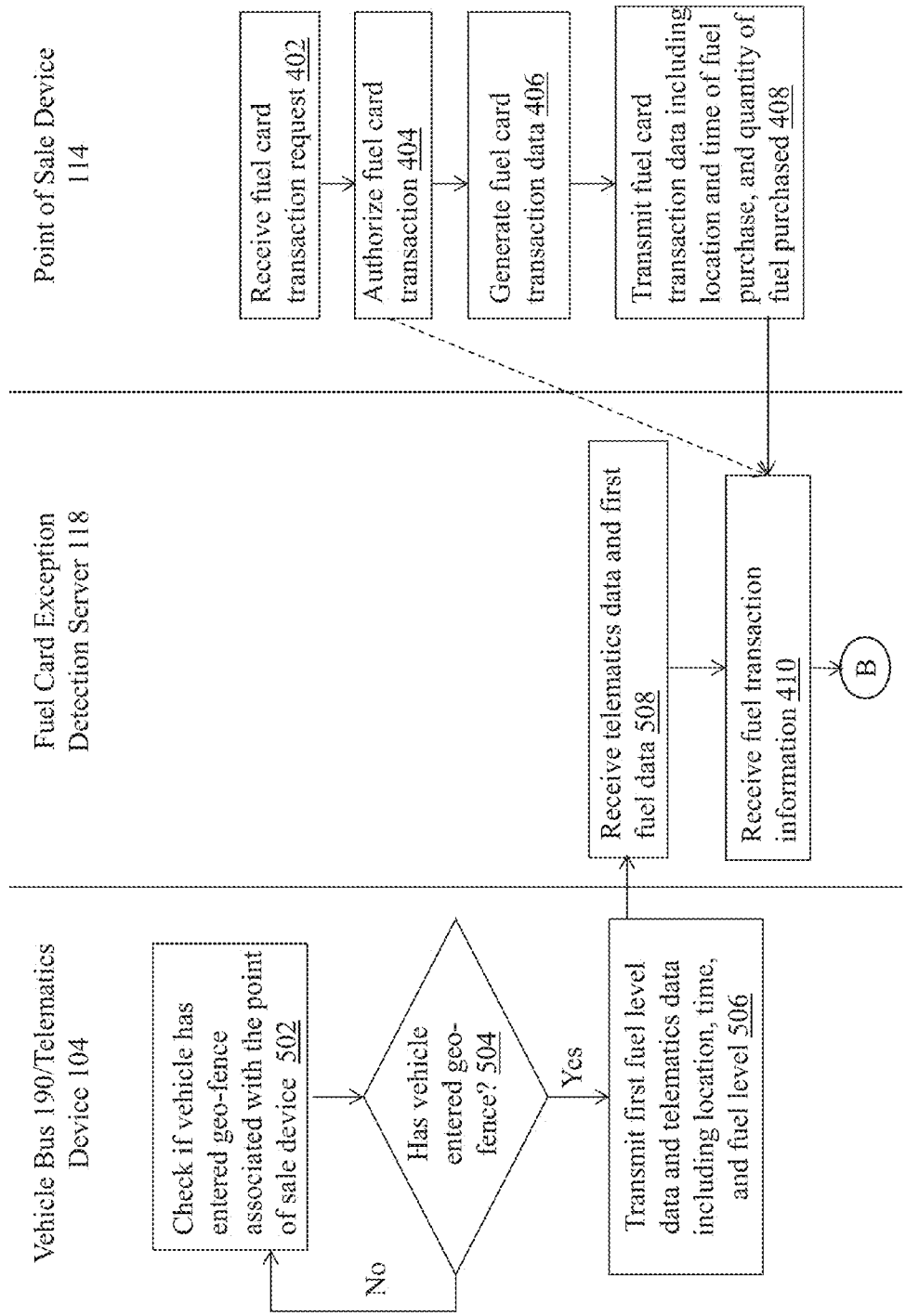
FIGS. 5A and 5B (collectively 'FIG. 5') is a flow chart that illustrates a process of detecting a fuel card usage exception while using geo-fences, according to certain exemplary embodiments of the present invention.
Figure 5B:
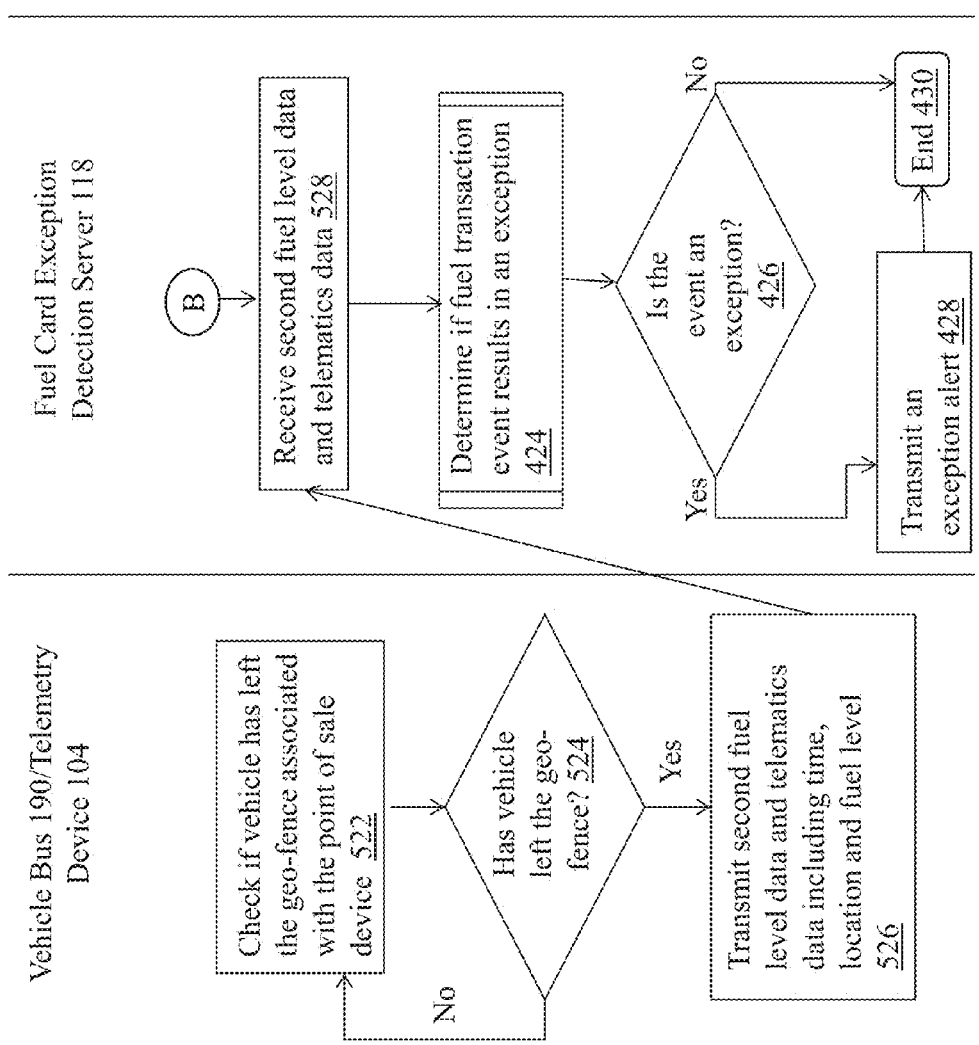

Now turning to FIG. 5, this figure is a flow chart that illustrates a process of detecting a fuel card usage exception while using geo-fences, according to certain exemplary embodiments of the present invention. The operations illustrated in FIG. 5 are largely the same as those illustrated in FIG. 4, except for operations 502-508, and operations 522-528, where the fuel level of the vehicle 102 is obtained when the vehicle crosses a geo-fence. Therefore, the description of FIG. 5 will be limited to the operations 502-508, and operations 522-528 for sake of brevity. As described earlier, a geo-fence may a virtual geographic boundary which may be user-settable and/or computer-settable. In the example embodiment illustrated in FIG. 5, the geo-fence may be set around each gas station to detect when a vehicle enters and/or leaves a gas station.

In some embodiments, the telematics device 104 may be configured to send telematics data and/or fuel level data when the vehicle 102 crosses a geo-fence. Accordingly, in operations 502 and 504, the telematics device 104 that attached to and/or integrated with the vehicle 102 may check if the vehicle has entered a geo-fence. If the vehicle has not entered the geo-fence, the telematics device 104 may continue to check if the vehicle enters a geo-fence on a continuous basis or at regular time intervals. However, if the telematics device 104 detects that the vehicle 102 has entered a geo-fence, then, in operation 506, the telematics device 104 may transmit the first fuel level data and a telematics data to the fuel card server 118. In another embodiments, the telematics device 104 may transmit the first fuel level data and the telematics data to the telematics server 106, which in turn may transmit it to the fuel card server 118.

Similarly, once the vehicle 102 has entered a geo-fence, in operations 522-528, the telematics device 104 may check if the vehicle 102 has left the geo-fence. When the vehicle 102 leaves the geo-fence, the telematics device 104 may transmit a second fuel level data and a telematics device to the fuel card server 118 and/or the telematics server 106. Further, as described above in association with FIGS. 4, and 6-8, in operations 424-430, the fuel card server 118 may detect an exception associated with a fuel card transaction based on the transaction data, the first fuel level data, the telematics data, and/or the second fuel level data. Once the exception is detected, the fuel card server 118 may be configured to generate and alert and transmit the alert for presentation by a computing device 160 associated with any appropriate authorized end user, such as a manager 110.

In some embodiments, the alerts may require an action on the end of the manager 110, such as block a fuel card from any further authorizations. In other embodiments, the alerts may not require an immediate action from the manager and may be in the form of a reports for which a user can register and subscribe through a web interface provided by a user-interface engine 316 of the fuel card server 118. In some scenarios, such as a transportation fleet management scenario, the report may include suggestions for the manager 110 based on analysis of the data stored in the repository 324, and/or the pattern database 328. For example, the report may provide cost analysis of operating one car against the cost of operating a van or another car. Further, the report may provide savings analysis such as how savings would a client achieve if the client operated a large, double-axle truck as opposed to a semi-trailer truck. In another example, the report may provide which routes are most efficient in terms of achieving the best gas mileage. The reports may be customized based on a user-preference which can be provided at the time of registration and subscription. On the basis of the kind of alert, the user, i.e., manager 110 may be charged a nominal fee.

In addition to providing reports and/or alerts, the fuel card server 118 may allow authorized end users to access the databases 324-328 of the fuel card server 118 and run analytics that the user desires. When the end user logs in, the end user may be authorized based on a username and password, biometric means, and so on. Once the end user is authorized, the user-interface engine 316 of the fuel card server 118 may provide the user-interface for the user to browse through the different analytics options provided to the user. The options provided to each user may vary based on an authorization level of the end user. For example, a manager may have full access to all the options, whereas a driver may have limited access to the options. The analytics options may be customized for each end user. For example, the manager 110 may be provided options to run analytics on the gas mileage patterns stored in the pattern database 328. In said example, the manager 110 may check an average gas consumption of all the vehicles that driver A drives. In another example, the manager 110 may obtain an average gas consumption of all Nissan sedans when they drive within downtown San Francisco. One of ordinary skill in the art can understand and appreciate that any appropriate analytics can be made feasible on any data stored in the fuel card server 118 and/or telematics server 106.

Turning back to FIGS. 4-5, in another embodiment, once the transaction data is received at the fuel card server 118, the fuel card server 118 may transmit the transaction data to the telematics server 106. Further, in said embodiment, instead of the fuel card server 118, the telematics server 106 may be configured to detect an exception associated with the fuel card usage. In other words, in said embodiment, the telematics server 106 may perform operations 424-430 and other supporting operations of receiving the first and the second fuel level data. In yet another embodiment, both the telematics server 106 and the fuel card server 118 may transmit the transaction data, the first and second fuel level data, and the transaction data to a third-party server that may be configured to determine an exception associated with the fuel card usage.

Figure 10A:
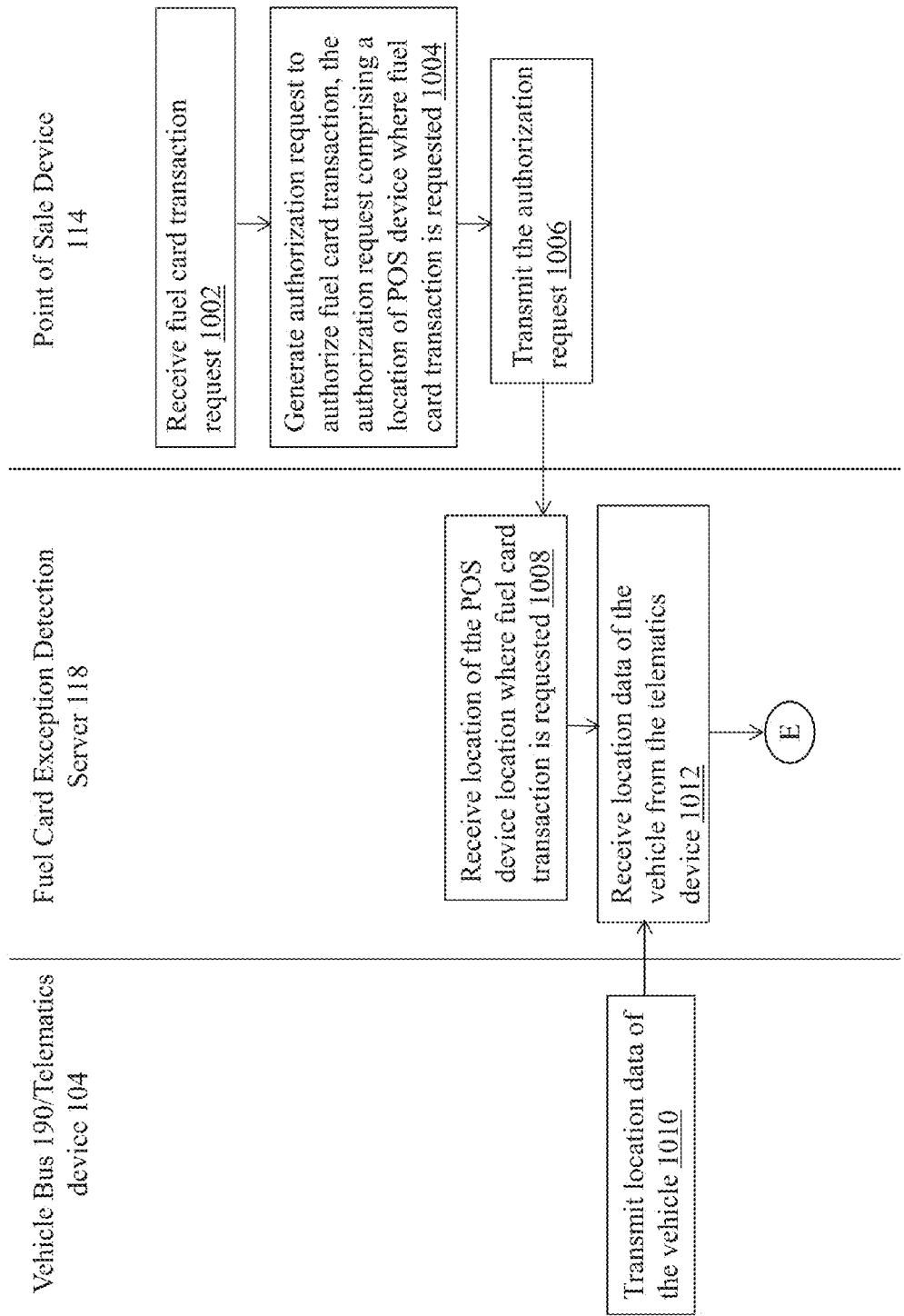
FIGS. 10A and 10B (collectively 'FIG. 10') is a flow chart that illustrates a process of providing an alert corresponding to a fuel card usage exception, according to certain exemplary embodiments of the present invention.
Figure 10B:
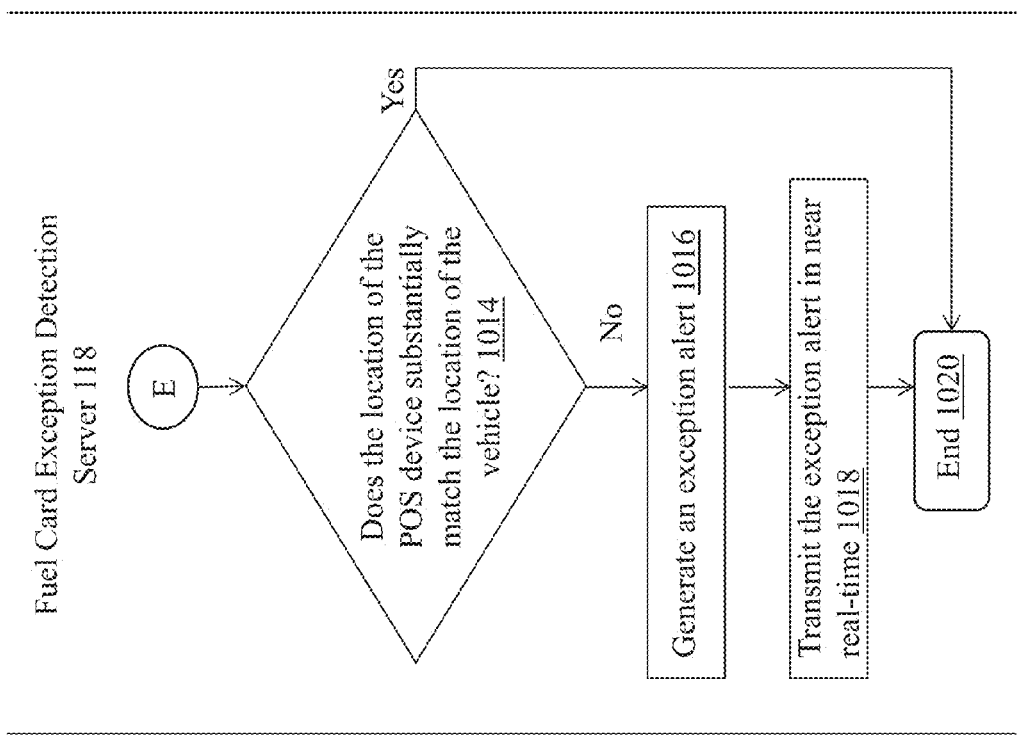
Figure 11A:
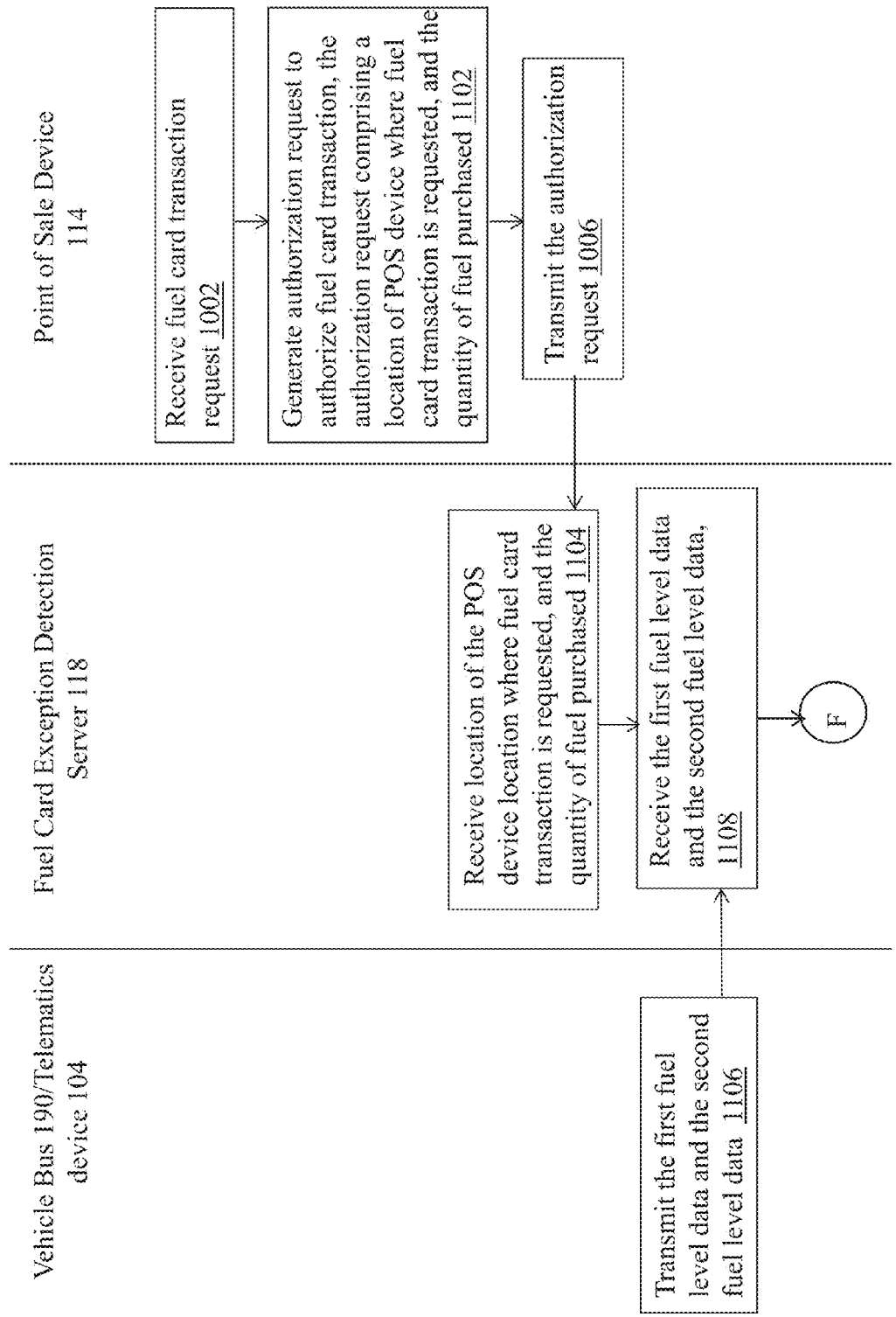
FIGS. 11A and 11B (collectively 'FIG. 11') is a flow chart that illustrates another process of providing an alert corresponding to a fuel card usage exception, according to certain exemplary embodiments of the present invention.
Figure 11B:
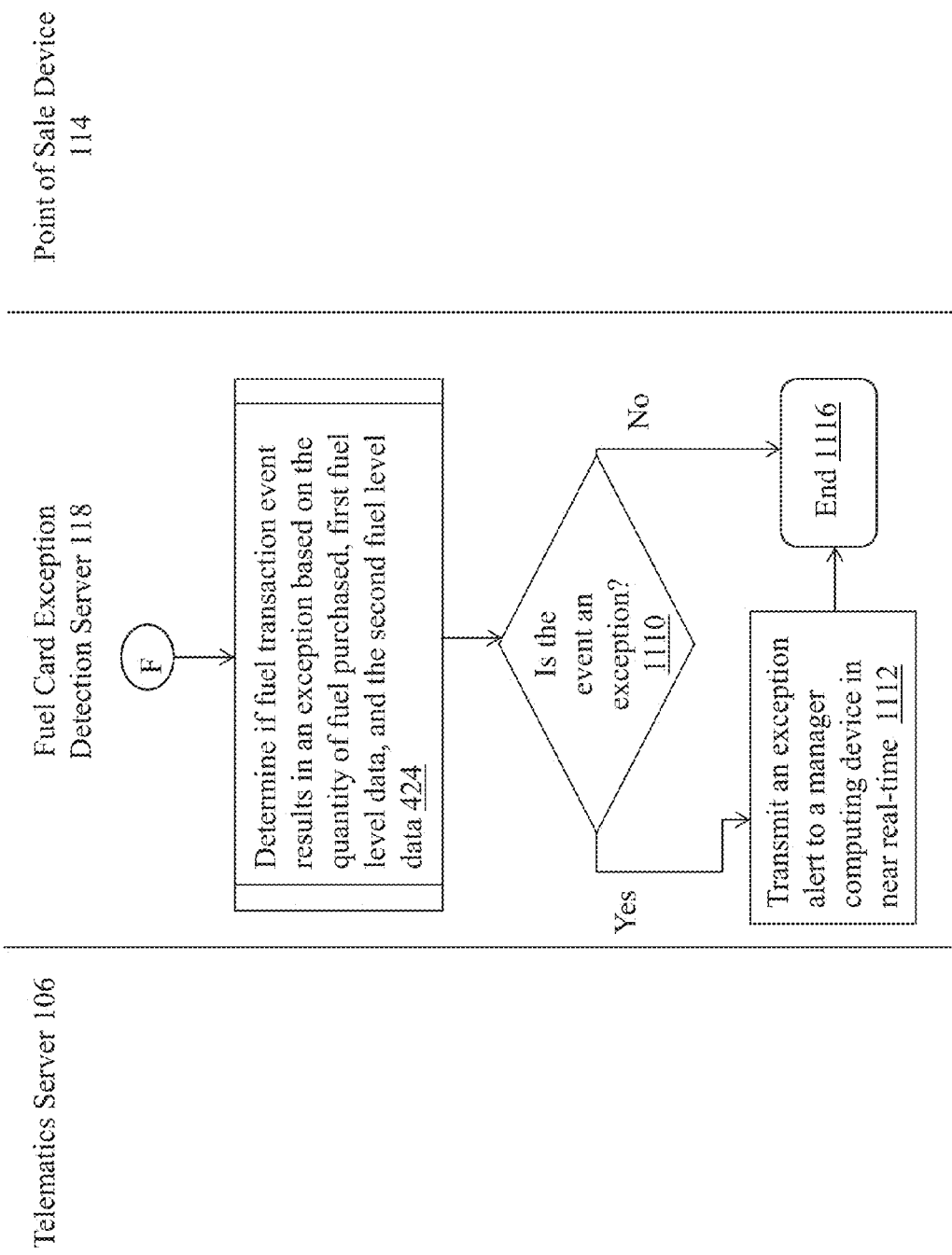

Turning to FIGS. 10 and 11, these figures illustrate a flow chart representative of a process associated with generating near real-time alerts. In particular, FIG. 10 is a flow chart that illustrates a process of generating near real-time alerts when non-proprietary fuel cards are used, according to certain exemplary embodiments of the present invention.

In operation 1002, the POS device 114 (e.g., POS system at a gas station) may receive a fuel card transaction request responsive to using a non-proprietary fuel card 112 at the POS device 114. Upon receiving the fuel card transaction request, in operation 1004, the POS device 114 may generate an authorization request to authorize the transaction request using the non-proprietary fuel card. The authorization request associated with authorizing the non-proprietary fuel card may include, inter alia, a location of the POS device 114 that received the fuel card transaction request for the non-proprietary fuel card 112. Further, in operation 1006, the POS device 114 may transmit the authorization request to the fuel card server 118 in near real-time. In some embodiments, the POS device 114 may transmit the authorization request to the transaction gateway 116 and/or the telematics server 106.

In operation 1008, the fuel card server 118 may receive the authorization request. Further, the fuel card server 118 may obtain a location of the POS device 114 from the authorization request. In one example embodiment, upon receiving the location of the POS device 114, the fuel card server 118 may transmit a request for the location of the vehicle 102 to the telematics device 104. Accordingly, in operation 1010, the telematics device 104 may transmit the location of the vehicle 102 to the fuel card server 118. In another example embodiment, in operation 1010, the telematics device 104 may be configured to automatically transmit the location of the vehicle 102 at regular intervals, wherein the automatic transmission of the location of the vehicle 102 is not based on receiving a request for the location. In some embodiments, the fuel card server 118 may receive the location of the vehicle from the telematics server 106.

In either case, in operation 1012, the fuel card server 118 may receive the location of the vehicle 102. Upon receiving the location of the vehicle 102, in operation 1014, the fuel card server 118 may determine if the location of the vehicle 102 substantially matches the location of the POS device 114 where the non-proprietary fuel card 112 is being used. The comparison may provide room for a threshold mismatch of location, for example a deviation of 10-20 meters or 50 meters to account for telematics device errors and/or satellite errors.

If the location of the vehicle 102 (including an acceptable error range) does not match the location of the POS device 114, then, in operation 1016, the fuel card server 118 may generate an exception alert. Further, in operation 1018, the fuel card server 118 may transmit the alert to a computing device 160 associated with the manager 110 in near real-time. In addition to the near real-time alert that is based on the location, the fuel card server 118 may transmit an alert based on the quantity of fuel purchased using the non-proprietary fuel card 112 at a later time upon receiving the fuel card transaction data, provided such an exception is detected. If the location of the vehicle 102 (including an acceptable error range) matches the location of the POS device 114, then, in operation 1020, the process of real-time alert generation ends.

Turning to FIG. 11, this figure is a flow chart that illustrates a process of generating near real-time alerts when proprietary fuel cards are used, according to certain exemplary embodiments of the present invention. As described in FIG. 10, in operation 1002, the POS device 114 may receive a fuel card transaction request, wherein the difference being that the fuel card 112 is a proprietary fuel card. Upon receiving the transaction request, in operation 1102, the POS device 114 may generate an authorization request to authorize the usage of the proprietary fuel card 112. The authorization request for the proprietary fuel card may include, inter alia, the quantity of fuel purchased using the proprietary fuel card and/or the location of the POS device 114 where the fuel card 112 is being used. Further, as described in FIG. 10, in operation 1006, the authorization request may be transmitted to the fuel card server 118 in near real-time.

In operation 1104, the fuel card server 118 may receive the authorization request and retrieve information regarding the quantity of fuel purchased using the proprietary fuel card and/or the location of the POS device 114.

Upon determining the quantity of fuel purchased using the proprietary fuel card, in operation 1106, the telematics device 104 may transmit the first fuel level data and second fuel level data of the vehicle 102, wherein the first and second fuel level data identifying a fuel level of the vehicle before and after purchase of fuel, respectively. In some embodiments, the first and second fuel level data may be transmitted automatically at regular intervals or in other embodiments, the first and second fuel level data may be transmitted upon receiving a request for the first and second fuel level data. In one example embodiments, the telematics server 106 may be configured to transmit the first and second fuel level data of the vehicle 102 to the fuel card server 118.

In operation 1108, the fuel card server 118 may receive the first and second fuel level data of the vehicle 102. Upon receiving the first fuel level data, the second fuel level data, and the quantity of fuel purchased from the authorization request in near real-time, the fuel card server 118 may determine if the fuel transaction event using the proprietary fuel card results in an exception as described in operation 424 of FIG. 4. Further, in operation 1110, if an exception is detected, the process continues to operation 1112. In operation 1112, the fuel card server 118 may generate and transmit an exception alert to the manager 110 in near real-time. The exception alert generated and transmitted in operation 1112 may be based on the quantity of fuel purchased. In some example embodiments, the exception alert transmitted to the manager 110 in operation 1112 may be a combination of an alert based on the location of the fuel purchase and an alert based on the quantity of fuel purchased. Once the alert is transmitted to the manager 110 in near real-time, or if the usage of the proprietary fuel card is not an exception, the process ends at operation 1116.

In one example, company ABC may operate two vehicles, vehicle 1 and vehicle 2 for business related activities. Company ABC may have user 110, such as a manager than handles the management and operations of the vehicles. One of ordinary skill in the art can understand and appreciate that manger is a representative example of user 110, and the user 110 may include any person associated with the company ABC and has the authority to manage the vehicles. The manager may assign John Doe to drive vehicle 1 and Jane Roe to drive vehicle 2. In addition, the manager may provide a first fuel card to John Doe and a second fuel card to Jane Roe for refueling their respective vehicles if needed. The first fuel card may be a proprietary fuel card and the second fuel card may be non-proprietary fuel card. Further, vehicle 1 may be integrated with a telematics device and vehicle 2 may be configured to be used with another telematics device. Accordingly, the other telematics device may be attached to an OBD port of vehicle 2.

Once John Doe receives the first fuel card, John Doe may pair the first fuel card with vehicle 1. In one embodiment, the first fuel card may be a smart card having NFC technology and vehicle 1 may include a NFC card reader. Accordingly, John Doe may tap the first fuel card against the NFC card reader in the vehicle and the first fuel card may be mapped to vehicle 1. In addition, the first fuel card may be mapped to John Doe's smart phone in a similar manner. Similarly, Jane Roe may pair the second fuel card with vehicle 2. In one embodiment, the second fuel card may be an online card which may be stored as an application in Jane Roe's smart phone, such as stored in a mobile wallet. Further, the second fuel card may be configured to automatically associate itself Jane Roe's smart phone and with vehicle 2 as soon as Jane Roe is within a close proximity of vehicle 2. Further, once cards are associated with the vehicles and/or the smart phones, the fuel card server 118 may receive a mapping of an identifier associated with a fuel card to a identifier associated with the vehicle and an identifier associated with the phone. In other words, the fuel card server 118 may receive a mapping of a card number associated with the first fuel card to a VIN number of vehicle 1 and an IMEI number of John Doe's smart phone. Similarly, the fuel card server 118 may receive a mapping of a card number associated with the second fuel card to a VIN number of vehicle 2 and an IMEI number of John Doe's smart phone. Once the mapping is received, the fuel card server 118 may store the mapping for future operations and may share the mapping with the telematics server 106.

Once the fuel cards have been assigned to the respective drivers and associated with their respective vehicles and/or computing devices, the drivers may start driving their respective vehicles. In said example, John Doe may drive on route 1 which may be a country side that is hilly and windy and Jane Roe may drive on route 2 which may be a city where the roads are relatively flat.

The telematics device of vehicle 1 may be configured to transmit fuel level of the vehicle to a telematics server 106 whenever the ignition is both turned on and turned off. Further, the telematics device of vehicle 1 may be configured to transmit telematics data to the telematics server 106 in 20 minute intervals while the vehicle is in motion. On the other hand, the telematics device of vehicle 2 may be configured to transmit both the fuel level and the telematics data of the vehicle whenever the vehicle enters or leaves a geo-fence which may be a threshold region around a gas station. Accordingly, the telematics server 106 may be collecting and storing both fuel levels of the vehicles and the telematics data of the vehicles as and when they are transmitted by the telematics device. The telematics data may include location of the vehicle based on a GPS reading, the heading direction of the vehicle, the speed of the vehicle, and so on. The information that is included in the telematics data can be user-configurable. In addition to providing information regarding the fuel levels of the vehicles, distance travelled by the vehicles, speed of the vehicles, and so on, each of data from the telematics device may be time stamped to indicate a time of recording of each data.

John Doe may drive vehicle 1 on route 1 from 10 am to 3 pm on Wednesday, and John Doe may make 10 stops. Accordingly, the telematics server 106 may receive 20 fuel level readings associated with vehicle 1 corresponding to each start and stop of the ignition for each stop that John Doe makes. Further, the telematics server 106 may receive numerous telematics data associated with vehicle 1 which are spaced by 10 minute intervals from 10 am to 3 pm. John Doe may also refuel his vehicle twice in the span of 10 am to 3 pm. Each data may have a timestamp, wherein the timestamp may provide a date and time at which the data reading was taken. Jane Roe may drive vehicle 2 on route 2 from 12 noon to 4 pm on Wednesday, and Jane Roe may stop once to fill gas. Accordingly, the telematics server 106 may receive two telematics data and fuel level data of vehicle 2 corresponding to the stop at the gas station.

When John Doe refuels vehicle 1, John Doe may purchase the fuel using the first fuel card assigned to him. Upon using the first fuel card, the POS device 114 may determine if an account associated with the first fuel card is approved to complete the purchase and further, if the current purchase satisfies all the rules associated with the first fuel card. In one embodiment, the rules associated with the first fuel card may be set by the manager, whereas rules associated with the second fuel card may be default rules assigned by a financial services entity associated with the second fuel card. The rules associated with the first fuel card and the second fuel card may be user-settable and editable. The POS device 114 may generate an authorization request for the first fuel card that is a proprietary fuel card. Accordingly, the authorization request may include a location of the POS device 114 and the quantity of fuel purchased by John Doe. The authorization request may be transmitted to the fuel card server 118 in near real-time for generation of a real-time alert. The real-time alert may be generated if the fuel purchase by John Doe results in an exception. In other words, if the location of the POS device received from the authorization request does not match a location of John Doe's vehicle and/or if the quantity of fuel purchased by John Doe that is received from the authorization request does not match a difference in fuel level of John Doe's vehicle before and after fuel purchase, then the fuel card server 118 may generate and transmit an alert to the manager 110 in near real-time.

Further, in said example, the rules associated with the first fuel card may allow the first user card to be used for only two purchases each day, and the second fuel card may have unregulated use. Accordingly, the POS device may check with the fuel card server if the purchase associated with the first fuel card can be authorized.

If the purchase can be authorized, John Doe may complete the fuel purchase using the first fuel card. Once the purchase is complete, the POS device may generate a fuel card transaction data which may include, inter alia, a card number associated with the fuel card, a location of purchase, a quantity of fuel purchased, a time and date of fuel purchase. Further, the fuel card transaction data may be transmitted to the fuel card server 118 after several days. The fuel card server 118 may use the fuel card transaction data to verify if the real-time alert that was generated based on the authorization request was not in error.

When Jane Doe refuels vehicle 2, Jane Doe may use a payment card that is different from the second fuel card. Therefore, no transaction data may be transmitted to the fuel card server 118. Alternatively, Jane Roe may use the second fuel card that is a non-proprietary fuel card. Accordingly, the POS device 114 may generate an authorization request that includes that is limited to a location of the POS device 114. The authorization request may be transmitted to the fuel card server 118 to determine if the location of the POS device 114 where the second fuel card is used matches the location of Jane Roe's vehicle. If the locations do not match, then the fuel card server 118 may generate and transmit an alert to the manager 110 in near real-time. In the example of Jane Roe where Jane Roe uses a non-proprietary fuel card, the real-time alert may be based on the location of the vehicle. Further, the fuel card server 118 may generate an alert based on the quantity of fuel purchased at a later time when the transaction data is received. In one embodiment, the transaction data may be received as batch data at the end of the day or as much as 2 to 3 days later.

In said example, the fuel card server may receive the transaction data at the end of the day or as much as 2 to 3 days later in the form of a batch data. Upon receiving the transaction data, the fuel card server 118 may either handle processing the transaction data by itself or forward it to the telematics server 106 for processing. In said example, the fuel card server 118 may handle processing of the transaction data by itself, wherein the fuel card server 118 may retrieve the information included in the transaction data. Further, the fuel card server 118 may determine the fuel card number and subsequently determine the vehicle identifier and/or smart phone identifier to which it is mapped. The card number associated with the first fuel card may be associated with the vehicle identifier of vehicle 1. Once it is determined that the transaction is associated with a first fuel card which in turn is associated with vehicle 1, the fuel card server 118 may determine a time and date of fuel purchase using the first fuel card based on the time stamp. The fuel card server 118 may determine that the time is 2 pm and the date is Wednesday. Accordingly, the fuel card server 118 may request the telematics server 106 for a first fuel level of vehicle 1 that is closest to 2 pm and prior to 2 pm. Further, the fuel card server may request the telematics server 106 for a second fuel level of vehicle 1 that is close to 2 pm and after 2 pm. In said example, the telematics server 106 may transmit the first fuel level that was recorded at 1:59 pm when the ignition was switched off for refueling the vehicle, and a second fuel level that was recorded at 2:05 pm when the ignition was switched on after refueling the vehicle.

The first fuel level may be 5 gallons and the second fuel level may be 8 gallons. Once the fuel levels are received, the fuel card server 118 may determine a capacity of vehicle 1's fuel tank from an external source. The fuel tank capacity of vehicle 1 may be 11 gallons. Based on the first fuel level before refueling and the tank capacity, the fuel card server may determine that vehicle 1 can only take in 6 more gallons before the fuel tank is full. Accordingly, the fuel card server 118 may start calculations to determine if the fuel purchase at 2 pm is an exception. To determine the exception, the fuel card server 118 may determine if the quantity of fuel purchased is greater than 6 gallons. The quantity of fuel purchased may be obtained from the transactional data and may indicate that 5 gallons of fuel was purchased. Since the quantity of fuel purchased does not cross the maximum fuel capacity of the fuel tank, no exception may be detected. However, the fuel card server 118 may perform another comparison, where the difference between the second fuel level and the first fuel level is compared with the quantity of fuel purchased. In said example, the difference in the fuel levels indicate that the tank was filled with 3 gallons, but the transaction data indicates that the 5 gallons of fuel was purchased, which means that there is a mismatch of 2 gallons that is accounted. Since there is a mismatch, the fuel card server 118 may generate an alert which may be transmitted to the manager who may take necessary actions.

Even if the values matched, the fuel card server 118 may conduct another comparison, where a pattern of John Doe's fuel purchase may be compared to the current fuel purchase. Accordingly, the John Doe's fuel purchase pattern may indicate that every Wednesday John Doe refuels his assigned vehicle with 3 gallons of fuel, but the current fuel purchase shows that John Doe purchased 5 gallons of fuel which does not follow the pattern. Since John Doe's current purchase does not follow John Doe's regular fuel purchase pattern that is determined based on plurality of transaction data associated with John Doe, the fuel card server 118 may generate an alert that is to be transmitted for presentation on a computing device associated with the manager.

In the case of Jane Roe where Jane Roe uses a payment card that is different from the second fuel card, even though the transaction data is unavailable, the fuel card server 118 may detect a refueling of vehicle 2 based on an analysis of the fuel level of vehicle 2 on Wednesday. Accordingly, the fuel card server 118 may compare a pair of successive fuel levels of the vehicle 2 and if the later fuel level in the pair is greater than the former fuel level, then the fuel card server 118 may detect that vehicle 2 has been refueled. For example, when comparing fuel level of vehicle 2 at 1 pm and 1:10 pm, if the fuel level at 1 pm is 4 gallons and the fuel level at 1:10 pm is 6 gallons, the increase in fuel level with time may indicate that the vehicle has been refueled. Then, the fuel card server 118 may search for transactional data associated with the second fuel card between 1 pm and 1:10 pm. When no transactional data is available, the fuel card server 118 may determine that Jane Roe may have refueled using a different card other than the second fuel card. If the pattern repeats, the fuel card server 118 may generate an alert to notify the manager and/or a customer care system that may check with Jane Roe. In other words, when Jane Roe sparingly uses the fuel card and/or does not use the fuel card, such events may be reported to the customer care system. Sparing usage may refer to a low frequency of usage or a usage frequency that is lower than a typical usage frequency of the assigned fuel card (or payment card). The customer care system may include customer care operator that may handle such issues. The customer care operator may be instructed to contact Jane Roe and determine why Jane Roe has not been using the assigned fuel card (or payment card). Further, information collected from Jane Roe may be stored and used to further improve services provided through the fuel card to promote frequent usage of the assigned fuel card (or payment card). In some embodiments, the customer care operator may be an automated system that is configured to make courtesy calls to determine why a user has not been using the assigned fuel card (or payment card).

In addition to the exception detection, the fuel card server 118 may also calculate a gas mileage of both the first and the second vehicle. Using the telematics data and the fuel level data stored in the telematics server 106, a gas mileage of vehicle 1 and vehicle 2 may be generated. In said example, based on the gas mileage of the vehicles driven by John Doe and Jane, Jane Roe may be projected as a better driver than John Doe. The calculated gas mileage may reflect a gas mileage of the vehicle when subjected to real-world conditions, such as load carried by the vehicle, roads conditions, weather conditions, and so on. The calculated gas mileage may vary based on seasons, weather, driving style of the driver, and so on. The fuel card server 118 may build a repository of gas mileage under different real-world conditions for each vehicle in the fleet owned by company ABC.

In addition to generating alerts, the fuel card server 118 may generate reports which may be accessed by end users, such as the manager or other clients. In some embodiments, such reports may be received periodically upon registering with the fuel card server 118 and subscribing for services provided by the server 118. Further registered end users may get to access the fuel card server 118 and run analytics based on the any appropriate data that is stored in the fuel card server 118 and/or the telematics server 106.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS based logic circuitry), firmware, software or any combination of hardware, firmware, and software (e.g., embodied in a machine readable medium). For example, the various electrical structures and methods may be embodied using transistors, logic gates, and electrical circuits (e.g., application specific integrated (ASIC) circuitry and/or in Digital Signal Processor (DSP) circuitry).

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the exemplary embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method, comprising:
receiving, by a server, a signal comprising an authorization request at a first time to authorize a fuel purchase event using a fuel card, wherein the authorization request comprises data that identifies a location of the fuel purchase event;

receiving, by the server, a signal comprising location data of a vehicle, the location data identifying a location of the vehicle;

comparing, by the server, the location of the fuel purchase event with the location of the vehicle;

determining, by the server, if the location of the fuel purchase event substantially matches the location of the vehicle;

generating, by the server, a first alert when the location of the fuel purchase event does not substantially match the location of the vehicle, the first alert being generated contemporaneous with the fuel purchase event;

transmitting, by the server, a signal comprising the alert for submission to and presentation by a communications device in a timeframe contemporaneous with the fuel purchase event;

responsive to the fuel purchase event using the fuel card, receiving, by the server, fuel card transaction data that is received as a batch data at a second time that is later than the first time, the fuel card transaction data identifying the location of the fuel purchase event and a quantity of fuel purchased for the vehicle;

validating, by the server, an accuracy of the first alert by comparing the location of the fuel purchase event obtained at the second time with a location of the vehicle at a time that substantially matches a time of the fuel purchase event; and responsive to a determination that the first alert is inaccurate, updating the first alert with a result of the comparison of the location of the vehicle obtained at the second time with the location of the vehicle at the time that substantially matches the time of the fuel purchase event.

2. The method of claim 1, wherein the signal comprising the authorization request is received prior to completion of the fuel purchase event.

3. The method of claim 1, further comprising: responsive to receiving the signal comprising the authorization request, determining that the fuel purchase event using the fuel card satisfies one or more rules associated with the fuel card.

4. The method of claim 3, wherein the one or more rules comprise a purchase limit associated with the fuel card.

5. The method of claim 3, wherein the one or more rules comprise a threshold number of transactions associated with the fuel card.

6. The method of claim 1, further comprising: responsive to receiving the signal comprising the authorization request, validating, by the server, a financial account associated with the fuel card.

7. The method of claim 1, further comprising determining that a financial services card other than the fuel card is used for the fuel purchase event when a comparison of the quantity of fuel purchased with a difference in fuel level of the vehicle prior to the fuel purchase event and fuel level of the vehicle responsive to the fuel purchase event indicates that the quantity of fuel purchased is less than the calculated difference of fuel levels.

8. A system, comprising:
a Point of Sale (POS) device that is configured to generate a signal comprising an authorization request when a fuel card is used at the POS device in association with a fuel purchase event, the signal comprising the authorization request is generated at a first time;

a telematics device disposed at a vehicle and configured to record a location data identifying a location of the vehicle and a fuel level data that identifies a fuel level associated with the vehicle; and a fuel card server that is communicatively coupled to the POS device and the telematics device, wherein the fuel card server is configured to:
  receive the signal comprising the authorization request to authorize the fuel purchase event using the fuel card, wherein the authorization request comprises data that identifies a location of the fuel purchase event;
  determine a time period associated with the fuel purchase event based on the authorization request;
  retrieve location data of the vehicle that identifies the location of the vehicle at a time period that substantially matches the time period of the fuel purchase event;
  compare the location of the fuel purchase event with the location of the vehicle at the time period that substantially matches the fuel purchase event;
  determine if the location of the fuel purchase event substantially matches the location of the vehicle;
  generate a first alert when the location of the fuel purchase event does not substantially match the location of the vehicle, the first alert being generated contemporaneous with the fuel purchase event; and
  transmit a signal comprising the alert for presentation by a communications device;
  responsive to the fuel purchase event using the fuel card, receive fuel card transaction data that is received as a batch data at a second time that is later than the first time, the fuel card transaction data identifying the location of the fuel purchase event and a quantity of fuel purchased for the vehicle;
  validate an accuracy of the first alert by comparing the location of the fuel purchase event obtained at the second time with a location of the vehicle at the time period that substantially matches the time period of the fuel purchase event; and
  responsive to a determination that the first alert is inaccurate, update the first alert with a result of the comparison of the location of the vehicle obtained at the second time with the location of the vehicle at the time period that substantially matches the time period of the fuel purchase event.

9. The system of claim 8, wherein responsive to receiving the signal comprising the authorization request, the fuel card server determines whether a financial account associated with the fuel card is valid for use in connection with the fuel purchase event.

10. The system of claim 8, wherein responsive to receiving the signal comprising the authorization request, the fuel card server determines whether the fuel purchase event using the fuel card satisfies one or more rules associated with the fuel card.

11. The system of claim 10, wherein the one or more rules comprise a purchase limit associated with the fuel card.

12. The system of claim 10, wherein the one or more rules comprise a threshold number of transactions associated with the fuel card.

13. The system of claim 8, wherein the signal comprising the authorization request is received prior to completion of the fuel purchase event.

14. A system, comprising:
  a computer network; and
  a fuel card server that is communicatively coupled to the computer network and configured to:
    receive a signal comprising an authorization request at a first time to authorize a fuel purchase event using a fuel card, wherein the authorization request comprises data that identifies a location of the fuel purchase event;
    retrieve location data of a vehicle that identifies the location of the vehicle at a time period that substantially matches a time period of the fuel purchase event;
    compare the location of the fuel purchase event with the location of the vehicle to determine if the location of the fuel purchase event substantially matches the location of the vehicle; and
    transmit a signal comprising first alert to a communication device via a wireless communication link when the location of the fuel purchase event does not substantially match the location of the vehicle, wherein the communication device is coupled to the fuel card server via a wireless communication link and is configured to present the first alert at a time period contemporaneous with the fuel purchase event;
    responsive to the fuel purchase event using the fuel card, receive fuel card transaction data that is received as a batch data at a second time that is later than the first time, the fuel card transaction data identifying the location of the fuel purchase event and a quantity of fuel purchased for the vehicle;
    validate an accuracy of the first alert by comparing the location of the fuel purchase event obtained at the second time with a location of the vehicle at a time that substantially matches a time of the fuel purchase event; and
    responsive to a determination that the first alert t is inaccurate, update the first alert with a result of the comparison of the location of the vehicle obtained at the second time with the location of the vehicle at the time that substantially matches the time of the fuel purchase event.

15. The system of claim 14, wherein responsive to receiving the signal comprising the authorization request, the fuel card server determines whether the fuel purchase event using the fuel card satisfies one or more rules associated with the fuel card.

16. The system of claim 15, wherein the one or more rules comprise a purchase limit associated with the fuel card.

17. The system of claim 15, wherein the one or more rules comprise a threshold number of transactions associated with the fuel card.

* * * * *